US012574775B2

(12) United States Patent
Park et al.

(10) Patent No.: US 12,574,775 B2
(45) Date of Patent: Mar. 10, 2026

(54) EARLY MEASUREMENT REPORTING VERIFICATION FOR NON-CONNECTED MODE USER EQUIPMENT

(71) Applicant: QUALCOMM Incorporated, San Diego, CA (US)

(72) Inventors: Changhwan Park, San Diego, CA (US); Ozcan Ozturk, San Diego, CA (US); Jae Ho Ryu, San Diego, CA (US); Jelena Damnjanovic, Del Mar, CA (US); Punyaslok Purkayastha, San Diego, CA (US); Carlos Cabrera Mercader, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 17/936,240

(22) Filed: Sep. 28, 2022

(65) Prior Publication Data

US 2024/0107353 A1     Mar. 28, 2024

(51) Int. Cl.
H04W 24/10 (2009.01)
H04B 17/318 (2015.01)
(Continued)

(52) U.S. Cl.
CPC .......... H04W 24/10 (2013.01); H04B 17/318 (2015.01); H04W 36/0085 (2018.08); H04W 76/20 (2018.02)

(58) Field of Classification Search
CPC . H04W 24/10; H04W 24/08; H04W 36/0058; H04W 52/244; H04W 72/20;
(Continued)

(56) References Cited

U.S. PATENT DOCUMENTS

| | | | | |
|---|---|---|---|---|
| 2013/0155890 A1* | 6/2013 | Bhattad | ............... | H04W 24/02 370/252 |
| 2018/0324621 A1* | 11/2018 | Thangarasa | ......... | H04W 56/001 |

(Continued)

FOREIGN PATENT DOCUMENTS

| | | | | | |
|---|---|---|---|---|---|
| CN | 110419234 B | * | 5/2023 | ........ | H04W 74/0833 |
| WO | WO-2020160304 A1 | | 8/2020 | | |
| WO | WO-2020167205 A1 | | 8/2020 | | |

OTHER PUBLICATIONS

Partial International Search Report—PCT/US2023/071854—ISA/EPO—Nov. 10, 2023.

(Continued)

*Primary Examiner* — Khalid W Shaheed
(74) *Attorney, Agent, or Firm* — Harrity & Harrity, LLP

(57)     ABSTRACT

Various aspects of the present disclosure generally relate to wireless communication. In some aspects, a user equipment (UE) may perform early measurement report (EMR) measurements for a first set of carriers in an EMR time window. The UE may perform at least one verification operation for the EMR measurements based at least in part on at least one carrier measurement in a verification time window. The UE may transmit, to a network node, measurement results associated with the EMR measurements for one or more carriers in the first set of carriers based at least in part on the at least one verification operation. Numerous other aspects are described.

28 Claims, 14 Drawing Sheets

700

(51) Int. Cl.
 *H04W 36/00* (2009.01)
 *H04W 76/20* (2018.01)

(58) Field of Classification Search
 CPC ..... H04W 72/21; H04W 88/06; H04W 72/23;
  H04W 28/10; H04W 4/08; H04W 48/18;
  H04L 5/0037; H04L 5/0091; H04L
  5/0096; H04B 17/24; H04B 17/309
 See application file for complete search history.

(56) References Cited

U.S. PATENT DOCUMENTS

2021/0235300 A1    7/2021   Teyeb et al.
2024/0107353 A1*   3/2024   Park ..................... H04W 76/20

OTHER PUBLICATIONS

VIVO: "Discussion on the Improvement on FR2 SCell/SCG Setup/resume", 3GPP TSG-RAN WG4 Meeting # 104-e, R4-2213018, 3rd Generation Partnership Project, Mobile Competence Centre, 650, Route Des Lucioles, F-06921 Sophia-Antipolis Cedex, France, vol. RAN WG4, No. Electronic Meeting, Aug. 15, 2022-Aug. 26, 2022, Aug. 10, 2022, pp. 1-3, XP052281710.
VIVO: "Validity of Measurement Result", 3GPP TSG-RAN WG2 Meeting #106, R2-1905817, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, 2 Pages, XP051729316.
CMCC: "Discussion on Power Saving in Intra-band RRM Measurements", 3GPP TSG RAN WG1 #96, R1-1902341, 3rd Generation Partnership Project, Mobile Competence Centre, 650, Route Des Lucioles, F-06921 Sophia-Antipolis Cedex, France, Ran WG1, No. Athens, Greece, Feb. 25, 2019-Mar. 1, 2019, Feb. 16, 2019, 3 Pages, XP051600035, The whole document.
Huawei, et al., "Reducing RRM Measurements for UE Power Saving", 3GPP TSG RAN WG1 Meeting #97, R1-1907520, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 8 Pages, XP051728953, The whole document.
International Search Report and Written Opinion—PCT/US2023/071854—ISA/EPO—Feb. 20, 2024.

* cited by examiner

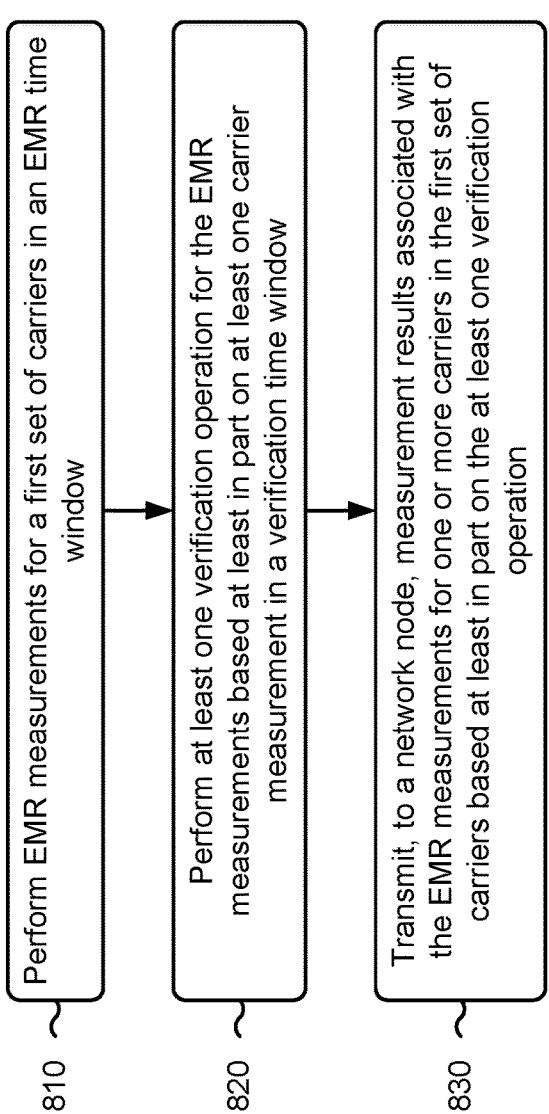

800

810 Perform EMR measurements for a first set of carriers in an EMR time window

820 Perform at least one verification operation for the EMR measurements based at least in part on at least one carrier measurement in a verification time window 830 Transmit, to a network node, measurement results associated with the EMR measurements for one or more carriers in the first set of carriers based at least in part on the at least one verification operation

FIG. 8

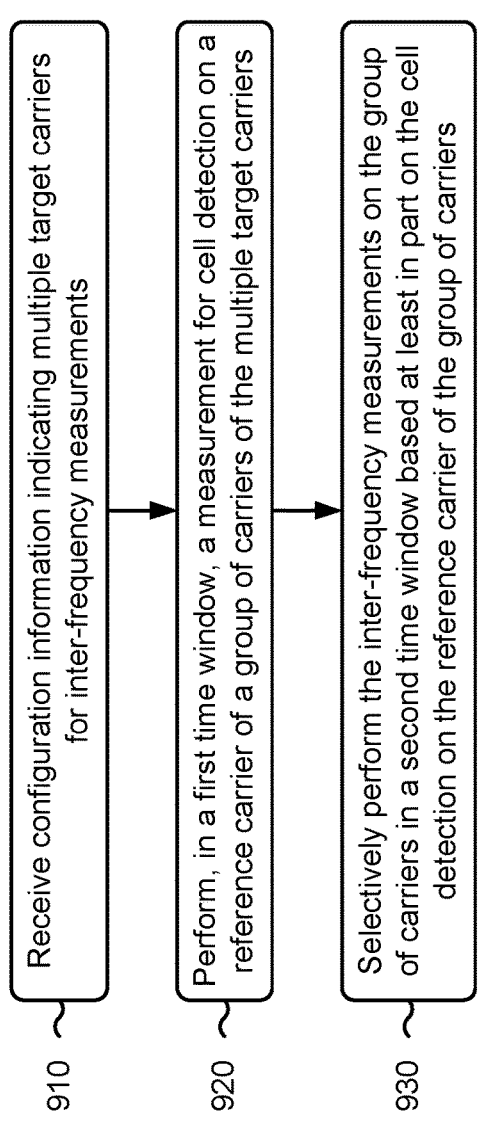

910 — Receive configuration information indicating multiple target carriers for inter-frequency measurements 920 — Perform, in a first time window, a measurement for cell detection on a reference carrier of a group of carriers of the multiple target carriers 930 — Selectively perform the inter-frequency measurements on the group of carriers in a second time window based at least in part on the cell detection on the reference carrier of the group of carriers

EARLY MEASUREMENT REPORTING VERIFICATION FOR NON-CONNECTED MODE USER EQUIPMENT

FIELD OF THE DISCLOSURE

Aspects of the present disclosure generally relate to wireless communication and to techniques and apparatuses for early measurement reporting verification for a non-connected mode user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include performing early measurement report (EMR) measurements for a first set of carriers in an EMR time window. The method may include performing at least one verification operation for the EMR measurements based at least in part on at least one carrier measurement in a verification time window. The method may include transmitting, to a network node, measurement results associated with the EMR measurements for one or more carriers in the first set of carriers based at least in part on the at least one verification operation.

Some aspects described herein relate to a method of wireless communication performed by a UE. The method may include receiving configuration information indicating multiple target carriers for inter-frequency measurements. The method may include performing, in a first time window, a measurement for cell detection on a reference carrier of a group of carriers of the multiple target carriers. The method may include selectively performing the inter-frequency measurements on the group of carriers in a second time window based at least in part on the cell detection on the reference carrier of the group of carriers.

Some aspects described herein relate to a UE for wireless communication. The UE may include a memory and one or more processors coupled to the memory. The one or more processors may be configured to perform EMR measurements for a first set of carriers in an EMR time window. The one or more processors may be configured to perform at least one verification operation for the EMR measurements based at least in part on at least one carrier measurement in a verification time window. The one or more processors may be configured to transmit, to a network node, measurement results associated with the EMR measurements for one or more carriers in the first set of carriers based at least in part on the at least one verification operation.

Some aspects described herein relate to a UE for wireless communication. The UE may include a memory and one or more processors coupled to the memory. The one or more processors may be configured to receive configuration information indicating multiple target carriers for inter-frequency measurements. The one or more processors may be configured to perform, in a first time window, a measurement for cell detection on a reference carrier of a group of carriers of the multiple target carriers. The one or more processors may be configured to selectively perform the inter-frequency measurements on the group of carriers in a second time window based at least in part on the cell detection on the reference carrier of the group of carriers.

Some aspects described herein relate to a non-transitory computer-readable medium that stores a set of instructions for wireless communication by a UE. The set of instructions, when executed by one or more processors of the UE, may cause the UE to perform EMR measurements for a first set of carriers in an EMR time window. The set of instructions, when executed by one or more processors of the UE, may cause the UE to perform at least one verification operation for the EMR measurements based at least in part on at least one carrier measurement in a verification time window. The set of instructions, when executed by one or more processors of the UE, may cause the UE to transmit, to a network node, measurement results associated with the EMR measurements for one or more carriers in the first set of carriers based at least in part on the at least one verification operation.

Some aspects described herein relate to a non-transitory computer-readable medium that stores a set of instructions for wireless communication by an UE. The set of instructions, when executed by one or more processors of the UE, may cause the UE to receive configuration information indicating multiple target carriers for inter-frequency measurements. The set of instructions, when executed by one or more processors of the UE, may cause the UE to perform, in a first time window, a measurement for cell detection on a reference carrier of a group of carriers of the multiple target carriers. The set of instructions, when executed by one or more processors of the UE, may cause the UE to selectively perform the inter-frequency measurements on the group of carriers in a second time window based at least in part on the cell detection on the reference carrier of the group of carriers.

Some aspects described herein relate to an apparatus for wireless communication. The apparatus may include means for performing EMR measurements for a first set of carriers in an EMR time window. The apparatus may include means for performing at least one verification operation for the EMR measurements based at least in part on at least one carrier measurement in a verification time window. The apparatus may include means for transmitting, to a network node, measurement results associated with the EMR measurements for one or more carriers in the first set of carriers based at least in part on the at least one verification operation.

Some aspects described herein relate to an apparatus for wireless communication. The apparatus may include means for receiving configuration information indicating multiple target carriers for inter-frequency measurements. The apparatus may include means for performing, in a first time window, a measurement for cell detection on a reference carrier of a group of carriers of the multiple target carriers. The apparatus may include means for selectively performing the inter-frequency measurements on the group of carriers in a second time window based at least in part on the cell detection on the reference carrier of the group of carriers.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-9 are diagrams illustrating example processes performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
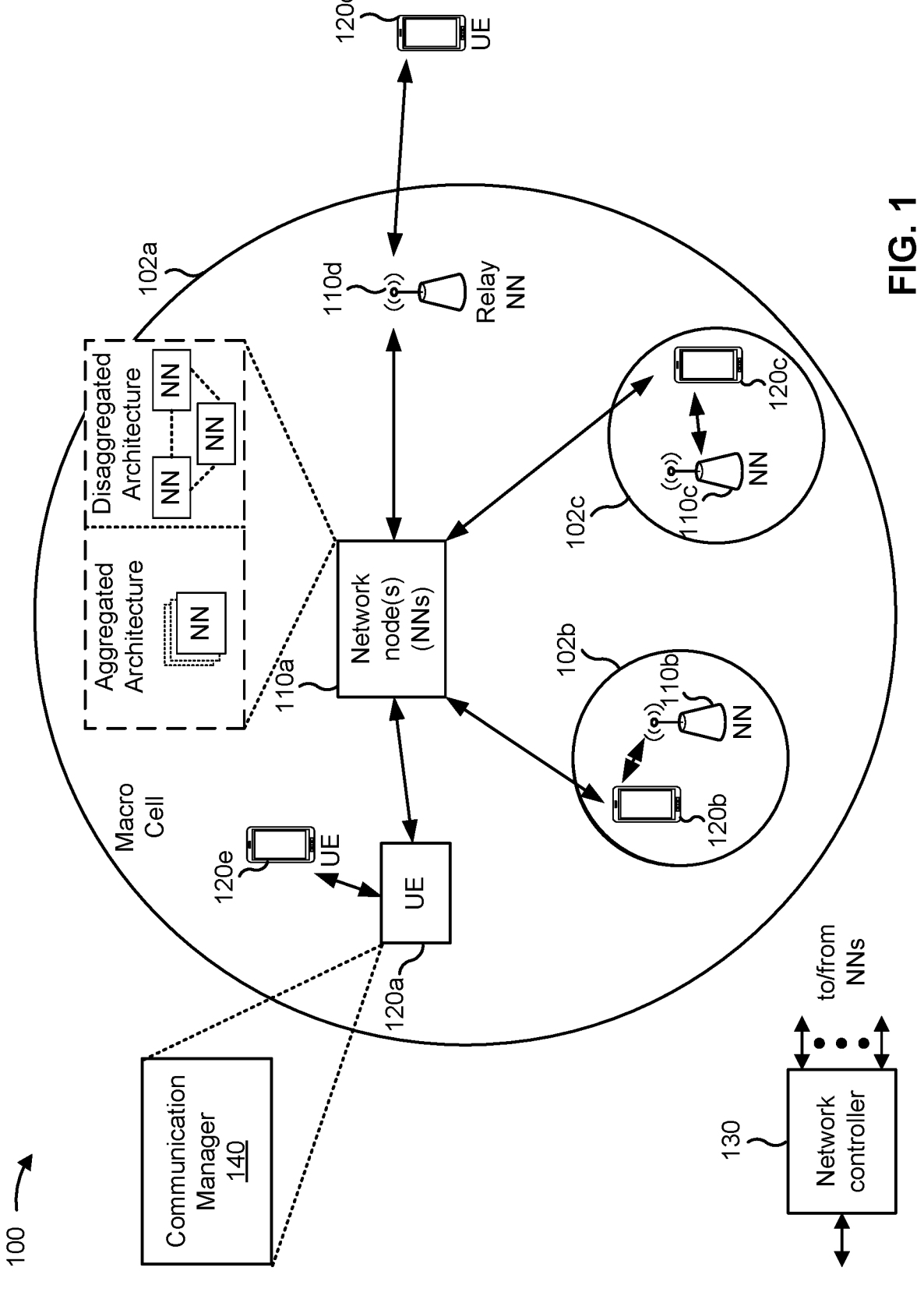
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform early measurement report (EMR) measurements for a first set of carriers in an EMR time window; perform at least one verification operation for the EMR measurements based at least in part on at least one carrier measurement in a verification time window; and transmit, to a network node, measurement results associated with the EMR measurements for one or more carriers in the first set of carriers based at least in part on the at least one verification operation. Additionally, or alternatively, the communication manager 140 may perform one or more other operations described herein.

In some aspects, as described in more detail elsewhere herein, the communication manager 140 may receive configuration information indicating multiple target carriers for inter-frequency measurements; perform, in a first time window, a measurement for cell detection on a reference carrier of a group of carriers of the multiple target carriers; and selectively perform the inter-frequency measurements on the group of carriers in a second time window based at least in part on the cell detection on the reference carrier of the group of carriers. Additionally, or alternatively, the communication manager 140 may perform one or more other operations described herein.

As indicated above, FIG. 1 is provided as an example. Other examples may differ from what is described with regard to FIG. 1.

Figure 2:
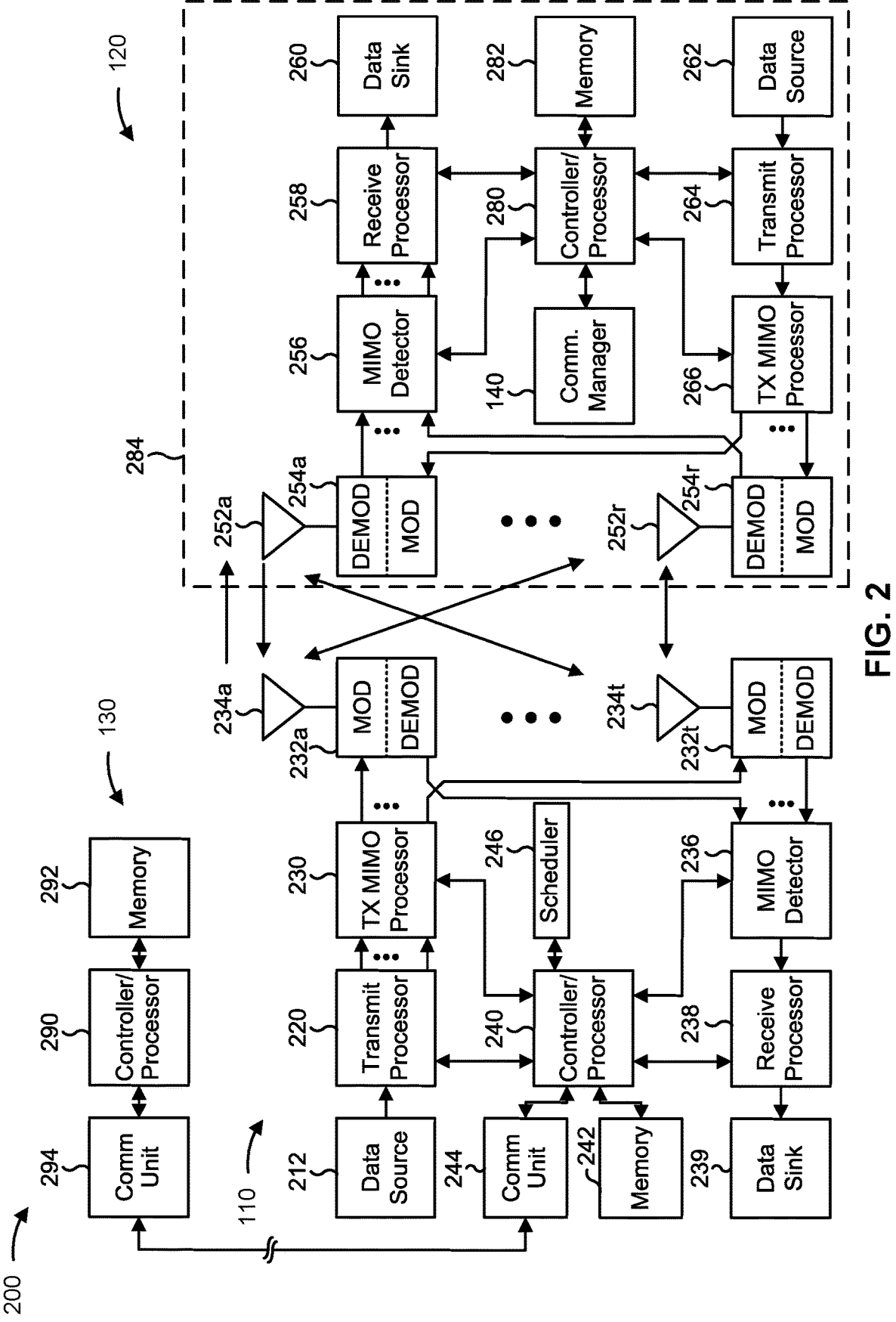
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A, 6B, 7A, 7B, and 8-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A, 6B, 7A, 7B, and 8-11).

The controller/processor 240 of the network node 110, the controller/processor 280 of the UE 120, and/or any other component(s) of FIG. 2 may perform one or more techniques associated with early measurement reporting verification for a non-connected mode UE, as described in more detail elsewhere herein. For example, the controller/processor 240 of the network node 110, the controller/processor

280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for performing EMR measurements for a first set of carriers in an EMR time window; means for performing at least one verification operation for the EMR measurements based at least in part on at least one carrier measurement in a verification time window; and/or means for transmitting, to a network node, measurement results associated with the EMR measurements for one or more carriers in the first set of carriers based at least in part on the at least one verification operation. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for receiving configuration information indicating multiple target carriers for inter-frequency measurements; means for performing, in a first time window, a measurement for cell detection on a reference carrier of a group of carriers of the multiple target carriers; and/or means for selectively performing the inter-frequency measurements on the group of carriers in a second time window based at least in part on the cell detection on the reference carrier of the group of carriers. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
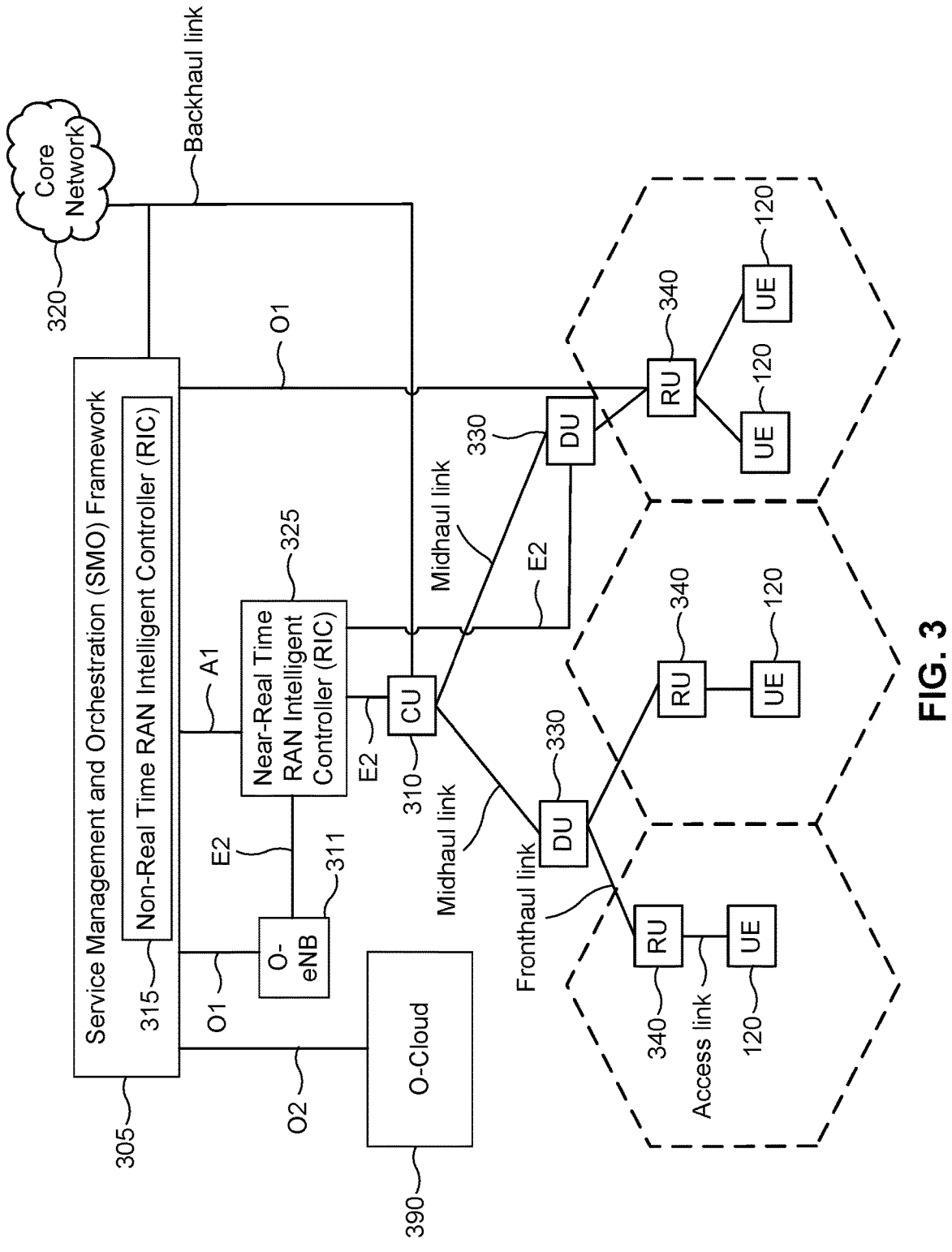
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT MC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
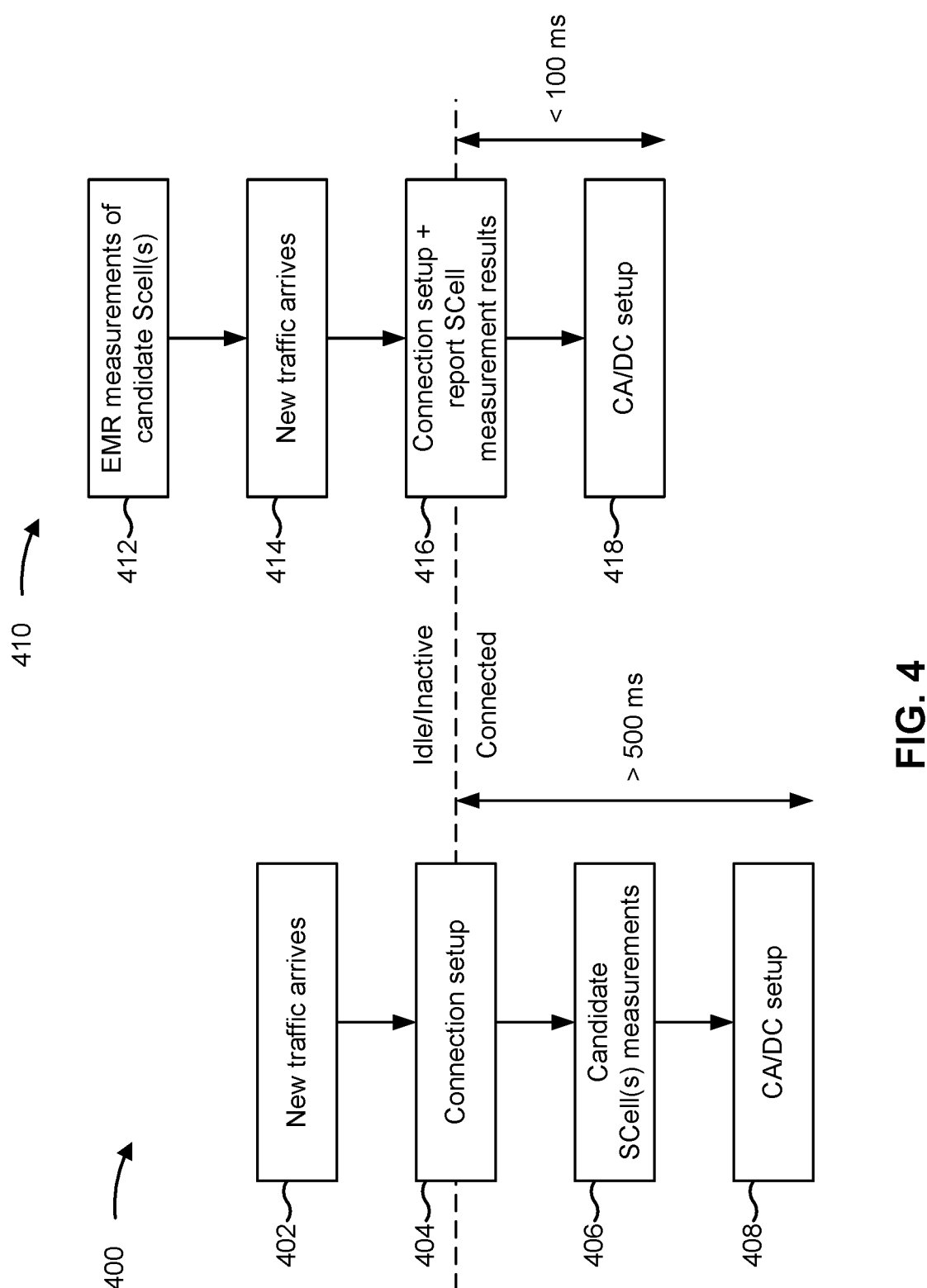
FIG. 4 is a diagram illustrating examples of secondary cell (SCell) setup for a UE when switching from a non-connected mode to a connected mode, in accordance with the present disclosure.

FIG. 4 is a diagram illustrating examples 400 and 410 of secondary cell (SCell) setup for a UE (e.g., UE 120) when switching from a non-connected mode to a connected mode, in accordance with the present disclosure. The connected mode may be an RRC connected mode, in which an active RRC connection is established between the UE and a network node (e.g., network node 110). The non-connected mode may be an idle mode (e.g., RRC idle) or an inactive mode (e.g., RRC inactive).

Example 400 is an example of SCell setup for a UE with no non-connected mode EMR measurements performed by the UE. As shown by reference number 402, new traffic to be transmitted to or from the UE may arrive while the UE is operating in the idle or inactive mode. For example, new downlink traffic to be transmitted to the UE from a network node may arrive in a buffer of the network node, or new uplink traffic to be transmitted by the UE to the network node may arrive in a buffer of the UE.

As shown by reference number 404, the UE and the network node may perform a connection setup procedure to establish a connection between the UE and the network (e.g., to switch the UE to the connected mode). The connection setup procedure may be an initial access procedure or a random access procedure, such as a 4-step random access channel (RACH) procedure or a 2-step RACH procedure. For example, in the 4-step RACH procedure, the UE may transmit, to the network node. a random access message (Msg1) that includes a physical RACH (PRACH) preamble using a PRACH resource associated with a synchronization symbol block (SSB) of the network node. The network node may transmit, to the UE a random access response (Msg2). The random access response (Msg2) may indicate a resource allocation to be used by the UE 120 to transmit an RRC connection request. The UE may transmit, to the network node, the RRC connection request (Msg3) in the resources allocated by the random access response. For example, the RRC connection request may be an RRC setup request message (e.g., when the UE is in the idle mode) or an RRC resume request (e.g., when the UE is in the inactive mode). The network node may transmit, to the UE, RRC connection setup message (Msg4). For example, the RRC connection setup may be an RRC setup message or an RRC resume message. The UE may then transmit, to the network node, a message (Msg5) that indicates that the UE has successfully received the RRC connection setup message. For example, Msg5 may be an RRC setup complete message or an RRC resume complete message. In some examples, the network node with which the UE establishes the RRC connection using the connection setup procedure may be a master node (MN) associated with a master cell group (MCG), and the UE may perform the connection setup procedure on a primary cell (PCell) of the MCG.

As shown by reference number 406, the UE, while operating in the connected mode (e.g., after the RRC connection is established in the connection setup procedure), may perform measurements of one or more candidate SCells. For example, the UE may perform measurements (e.g., RSRP and/or RSRQ measurements) of one or more SCells of the MCG. Additionally, or alternatively, the UE may perform measurements (e.g., RSRP and/or RSRQ measurements) of cells in one or more candidate secondary cell groups (SCGs). In some examples, the UE may receive, from the network node, on the PCell, a configuration of the candidate SCell measurements to be performed, and the UE may perform the measurements of the candidate SCells (and/or the candidate SCGs) based at least in part on the configuration. The UE may report the measurements of the candidate SCells (and/or the candidate SCGs) to the network node (e.g., the MN).

As shown by reference number 408, the network node and the UE may perform a carrier aggregation (CA) and/or dual connectivity (DC) setup procedure. CA is a technology that enables two or more component carriers (CCs, sometimes referred to as carriers) to be combined (e.g., into a single channel) for a single UE to enhance data capacity. In CA, the UE is configured with a PCell (also referred to as a primary carrier) and one or more SCells (also referred to as secondary carriers). The terms "carrier" and "cell" may be used interchangeably herein. In some examples, the network node may configure an SCell based at least in part on the candidate SCell measurements, and the network node may activate the SCell for the UE. For example, the network node may transmit a MAC control element (MAC-CE) for SCell activation to the UE to activate the SCell for the UE. Once the SCell is activated, the UE may receive and/or transmit traffic using the SCell. In some examples, the network node may configure and activate multiple SCells for the UE.

In DC, the UE may be configured to communicate with an MN (e.g., a first network node) on an MCG and a secondary node (SN) (e.g., a second network node) on an SCG. In this case, the UE may be configured with CA on each cell group (e.g., the MCG and the SCG). That is, the MCG may include a PCell and one or more SCells, and the SCG may include a primary secondary cell (PSCell) (e.g., a primary cell of the SCG) and one or more SCells. In some examples, the MN may transmit, to the UE, a configuration of an SCG, and the UE may communicate with the SN based at least in part on the configuration of the SCG.

Example 410 is an example of SCell setup for a UE with non-connected mode EMR measurements performed by the UE. As shown by reference number 412, the UE, while operating in a non-connected mode (e.g., an idle mode or an inactive mode), may perform EMR measurements of one or more candidate SCells. EMR measurements are measurements of one or more carriers (or cells) performed in an idle mode (e.g., RRC idle) or an inactive mode (e.g., RRC inactive) with a time duration of the UE switching to the idle mode or the inactive mode. The UE may receive, from a network node (e.g., while operating in the connected mode), an EMR measurement configuration that indicates the carriers/cells for which the EMR measurements are to be performed by the UE. For example, the EMR measurement configuration (e.g., EarlyMeasConfig) may be included in an RRC release message that triggers the UE to switch from the connected mode to the idle mode or the inactive mode. When the UE switches to the idle mode or the inactive mode, the UE may perform the EMR measurements, in accordance with the EMR measurement configuration, during a time duration associated with an EMR timer. For example, the EMR timer may be a timer (e.g., a T331 timer in a 3GPP standard) that begins upon the UE receiving the RRC release message that triggers the UE to switch to the idle mode or the inactive mode.

The UE may be configured to perform EMR measurements of one or more inter-frequency CA/DC candidate cells (e.g., one or more candidate SCells and/or cells of one or more candidate SCGs). An inter-frequency cell (or inter-frequency carrier) is a cell/carrier to be measured that is on a different frequency from a frequency of the cell/carrier of a current serving cell for the UE (e.g., the cell/carrier on which the UE is camped in the idle/inactive mode). An inter-frequency measurement is a measurement performed on an inter-frequency cell/carrier. In some examples, the UE may have a capability to perform EMR measurements for up to a certain quantity of inter-frequency carriers. For example, the UE may be configured with up to 7 NR inter-frequency carriers in accordance with a budget for a total number of inter-frequency/inter-RAT carriers for measurement in the idle or inactive mode.

The set of carriers configured for the EMR measurements may include one or more overlapping carriers with a set of carriers configured for mobility measurements (e.g., cell reselection measurements) in the idle/inactive mode. An overlapping carrier is a carrier included in the set of carriers configured for the EMR measurements and the set of carriers configured for the mobility measurements. The set of carriers configured for the EMR measurements may include one or more non-overlapping carriers that are not included in the set of carriers configured for the mobility measurements. In some examples, there may be no differentiation between the overlapping carriers and the non-overlapping carriers with respect to performing the mobility measurements. For example, the measurement intervals for the EMR measurements may be the same as the measurement intervals for the mobility measurements in the idle/inactive mode.

In some examples, the EMR measurements may include cell/carrier-level measurements (e.g., cell/carrier-level RSRP and/or RSRQ measurements) for each carrier and/or beam-level measurements (e.g., beam-level RSRP and/or RSRQ measurements) for multiple beams (e.g., associated with respective SSBs) for each carrier. In some examples, the beam-level EMR measurements may be an optional capability of the UE. The measurement time for beam-level EMR measurements may be scaled similarly to beam-level connected mode measurements (e.g., with a scaling factor for an SSB reading time of 3 for FR1 and 5 for FR2). In some examples, the UE may perform beam-level EMR measurements for up to 7 SSB indexes and/or physical cell identifiers (PCIs) for FR1 and up to 10 SSB indexes and/or PCIs for FR2. In some examples, thresholds for measurement accuracy and signal-to-noise ratio (SNR) for the EMR measurements may be relaxed by 1.5 dB and 2 dB, respectively, as compared to connected mode measurements.

As shown by reference number 414, new traffic to be transmitted to or from the UE may arrive while the UE is operating in the idle or inactive mode. For example, new downlink traffic to be transmitted to the UE from a network node may arrive in a buffer of the network node, or new uplink traffic to be transmitted by the UE to the network node may arrive in a buffer of the UE.

As shown by reference number 416, the UE and the network node may perform a connection setup procedure to establish a connection between the UE and the network (e.g., to switch the UE to the connected mode), and the UE may report the EMR measurement results for the one or more candidate SCells during the connection setup procedure. The connection setup procedure may be an initial access procedure or a random access procedure, such as a 4-step RACH procedure or a 2-step RACH procedure.

In some aspects, in a case in which the UE is in the inactive mode (e.g., RRC inactive), the RRC resume message (Msg4) transmitted to the UE by the network node (e.g., the last serving MN for the UE) during the RACH procedure may include a request for reporting of the EMR measurements. In this case, the UE may include EMRs that indicate the EMR measurements of the one or more SCell candidates in the RRC resume complete message (Msg5) transmitted to the network node (e.g., the last serving MN) in the RACH procedure.

In some other aspects, in a case in which the UE is in the idle mode (e.g., RRC idle) or the inactive mode (e.g., RRC inactive), the UE may include an indication that a measurement report is available in Msg5 (e.g., in the RRC setup complete message or the RRC resume complete message transmitted to the network node) during the RACH procedure. In this case, the network node may transmit, to the UE, a UE information request that includes a measurement report request. The UE may then transmit, to the network node (e.g., the MN) an UE information response that includes EMRs that indicate the EMR measurements of the one or more SCell candidates. In some examples, the network node may transmit the UE information request to the UE after configuring the UE with security information. For example, the network node, after receiving Msg5 (e.g., the RRC setup complete message or the RRC resume complete message), may transmit an RRC security mode command to the UE. The UE may transmit an RRC security mode complete message to the network node. The network node may then transmit the UE information request to the UE after receiving the RRC security mode complete message from the UE.

As shown by reference number 418, the network node and the UE may perform a CA and/or DC setup procedure based at least in part on the EMR measurements. For example, the network node may configure an SCell based at least in part on the EMR measurements for the one or more candidate SCells, and the network node may activate the SCell for the UE. For example, the network node may transmit a MAC-CE for SCell activation to the UE to activate the SCell for the UE. Once the SCell is activated, the UE may receive and/or transmit traffic using the SCell. In some examples, the network node may configure and activate multiple SCells for the UE based at least in part on the EMR measurements for the one or more candidate SCells. Additionally, or alternatively, the network node (e.g., the MN) may configure and/or activate an SCG for the UE based at least in part on the EMR measurements. In this case, the UE may communicate with an SN on the SCG once the SCG is configured and/or activated for the UE.

As shown in example 400 of FIG. 4, in an example in which EMR measurements are not reported, the amount of time between the UE switching to the connected mode and the completion of CA/DC setup may exceed 500 ms. As shown in example 410 of FIG. 4, in an example in which the EMR measurements are reported, the amount of time between the UE switching to the connected mode and the completion of the CA/DC setup may be less than 100 ms. Thus, the use of the EMR measurements in the CA/DC setup procedure reduces latency associated with the CA/DC setup procedure when the UE switches to the connected mode, as compared to the CA/DC setup procedure without the EMR measurements. For example, the use of the EMR measurements in the CA/DC setup procedure reduces an amount of time for configuration and activation of an SCell when the UE switches from the idle/inactive mode to the connected mode.

As indicated above, FIG. 4 is provided as an example. Other examples may differ from what is described with respect to FIG. 4.

Figure 5A:
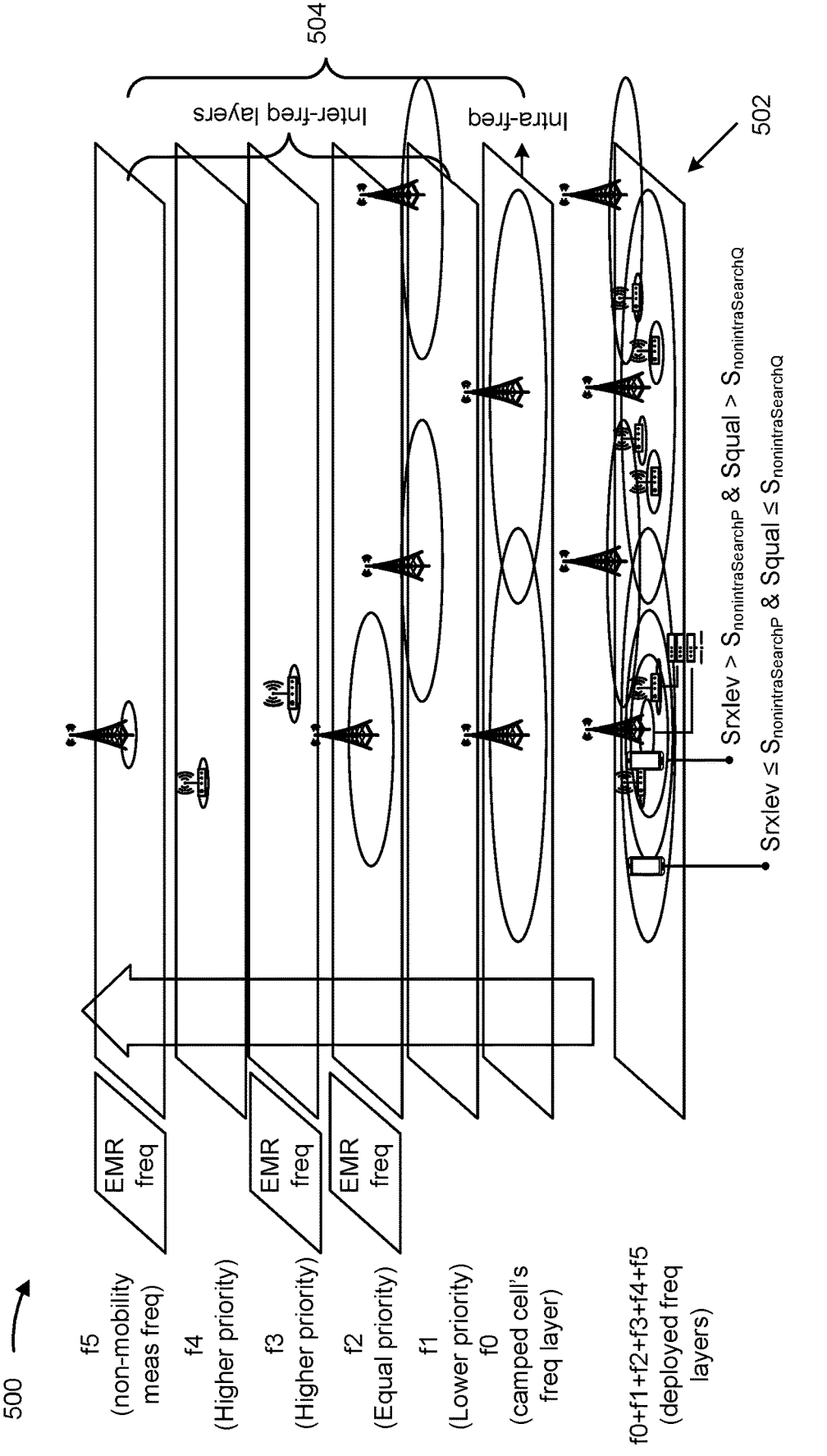
FIGS. 5A-5B are diagrams illustrating an example of a non-connected mode UE configured with inter-frequency layers for cell reselection and early measurement report (EMR) measurements, in accordance with the present disclosure.
Figure 5B:
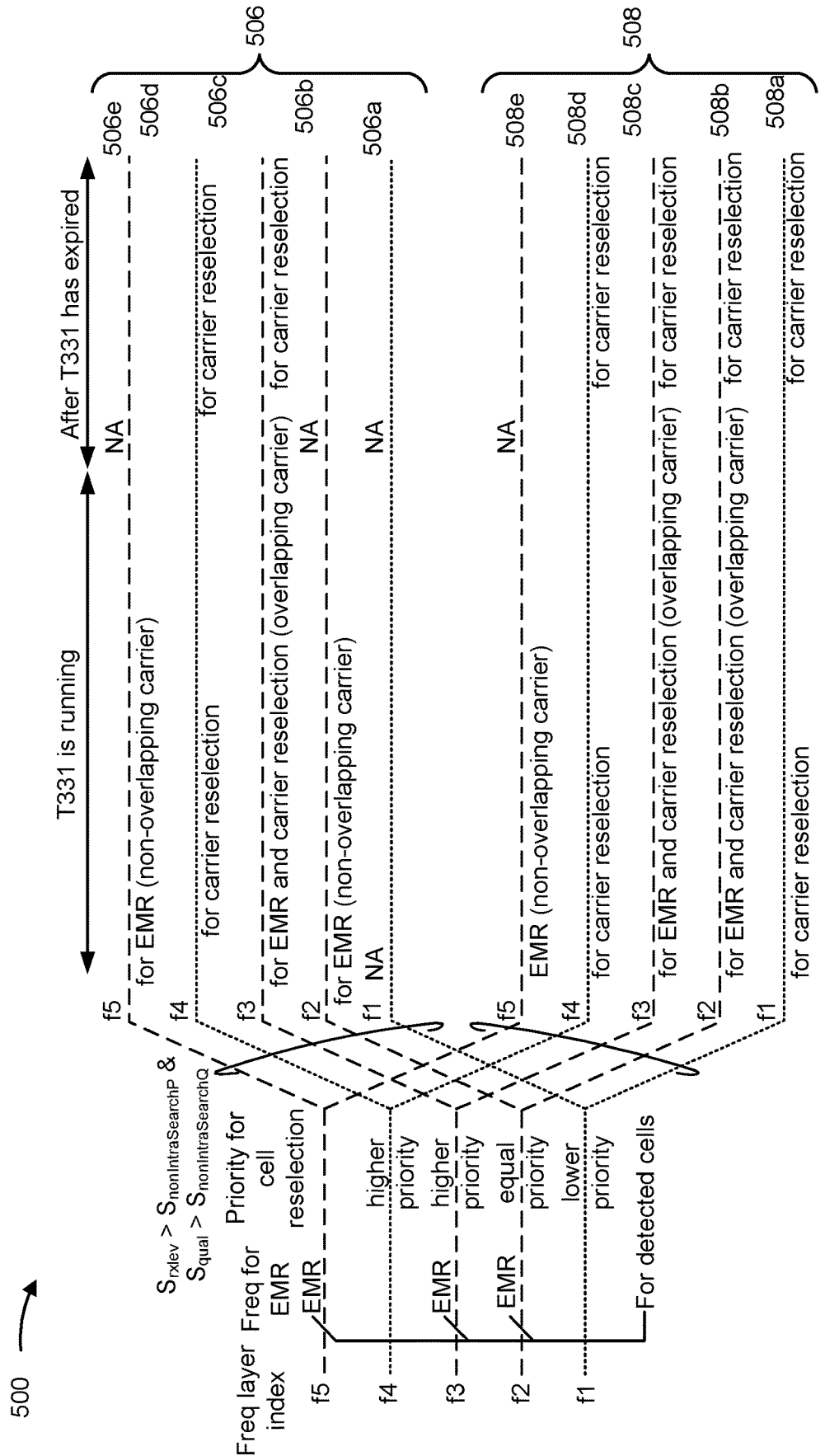

FIGS. 5A-5B are diagrams illustrating an example 500 of a non-connected mode UE configured with inter-frequency layers for cell reselection and EMR measurements, in accordance with the present disclosure.

As shown in FIG. 5A, example 500 includes a deployment scenario (shown by reference number 502) in which an RRC idle mode or RRC inactive mode UE (e.g., UE 120) is configured with inter-frequency layers for cell reselection and EMR measurements. As shown by reference number 502, the deployment scenario may include a wireless network with multiple serving cells deployed in multiple frequency layers (f0, f1, f2, f2, f4, and f5). As shown by reference number 504, FIG. 5A shows a decomposed view with respect to frequency layers for the deployment scenario. As shown in FIG. 5A, frequency layer f0 may be the frequency layer on which an idle/inactive mode UE is camped, and the UE may perform intra-frequency cell reselection measurements (e.g., intra-frequency mobility measurements) for carriers/cells in f0. As further shown in FIG. 5A, frequency layers f1, f2, f3, f4, and f5 may be inter-frequency layers (e.g., frequency layers other than the frequency layer f0 on which the UE is camped). Frequency layers f2, f3, and f5 may be frequency layers configured for EMR measurements (e.g., frequency layers for carriers configured for EMR measurements), and may be referred to as "EMR frequency layers." In some aspects, the EMR frequency layers (f2, f3, and f5) may be frequency layers for carriers for which CA can be configured with the current serving cell on which the UE is camped. That is, the EMR frequency layers (f2, f3, and f5) may be frequency layers for candidate SCells for the UE.

Frequency layers f1, f2, f3, and f4 may be configured for cell reselection measurements (e.g., mobility measurements), and may be configured with priorities for cell reselection. Frequency layer f1 may be configured with a lower cell reselection priority than frequency layer f0, frequency layer f2 may be configured with an equal cell reselection priority to frequency layer f0, and frequency layers f3 and f4 may be configured with a higher cell reselection priority than frequency layer f0. Frequency layer f5 may be a non-measurement mobility frequency layer (e.g., a frequency layer not configured for mobility/cell reselection measurements).

In some examples, the frequency layers on which a UE performs inter-frequency cell reselection measurements (e.g., mobility measurements) while in the idle/inactive mode may be based at least in part on a determination of whether a UE mobility criterion is satisfied. For example, the UE mobility criterion may be satisfied when a serving cell signal power level ($S_{rxlev}$) (e.g., an RSRP measurement on the serving cell) is less than or equal to a power threshold (e.g., $S_{nonintraSearchP}$) and/or a serving cell signal quality (Squat) (e.g., an RSRQ measurement on the serving cell) is less than or equal to a quality threshold (e.g., $S_{nonintraSearchQ}$). As shown in FIG. 5A, a first UE (UE1) may not satisfy the UE mobility criterion (e.g., $S_{rxlev} > S_{nonintraSearchP}$ and $S_{qual} > S_{nonintraSearchQ}$), and a second UE (UE2) may satisfy the UE mobility criterion (e.g., $S_{rxlev} \leq S_{nonintraSearchP}$ and $S_{qual} \leq S_{nonintraSearchQ}$). In some examples, a UE that satisfies the UE mobility criterion (e.g., UE2) may perform inter-frequency cell reselection measurements in frequency layers configured with all cell reselection priorities (e.g., f1, f2, f3, and f4) while operating in the idle/inactive state. In some examples, a UE that does not satisfy the UE mobility criterion (e.g., UE1) may perform inter-frequency cell reselection measurements only in frequency layers configured with a higher cell reselection priority than the current serving cell (e.g., f3 and f4) while operating in the idle/inactive state.

FIG. 5B shows inter-frequency measurements performed by an idle/inactive mode UE in the deployment scenario shown in FIG. 5A. As shown in FIG. 5B, EMR measurements may be performed by the idle/inactive mode UE only while an EMR timer (e.g., a T331 timer) is running, and cell/carrier reselection measurements may be performed by the idle/inactive mode UE while the EMR timer (e.g., the T331 timer) is running and after the EMR timer (e.g., the T331 timer) has expired.

As shown by reference number 506, FIG. 5B shows inter-frequency measurements performed in the frequency layers by the idle/inactive mode UE in a case in which the UE mobility criterion is not satisfied for the UE (e.g., $S_{rxlev} > S_{nonintraSearchP}$ and $S_{qual} > S_{nonintraSearchQ}$). In this case, cell/carrier reselection measurements are performed only for carriers in frequency layers f3 and f4 (e.g., the frequency layers with higher cell reselection priorities than the frequency layer f0 on which the UE is camped). As shown by reference number 506a, the UE does not perform any measurements in frequency layer f1, which is not configured for EMR and is configured with a lower cell reselection priority than the serving cell. As shown by reference number 506b, the UE performs measurements for EMR for a carrier in frequency layer f2 (e.g., a non-overlapping carrier with the set of carriers for which cell/carrier reselection measurements are performed) while the EMR timer is running, and the UE does not perform measurements for the carrier in frequency layer f2 after the EMR timer has expired. As shown by reference number 506c, the UE performs measurements for EMR and carrier/cell reselection for a carrier in frequency layer f3 (e.g., an overlapping carrier configured for EMR and cell reselection measurements) while the EMR timer is running, and the UE continues to perform the measurements for carrier/cell reselection for the carrier in frequency layer f3 after the EMR timer has expired. As shown by reference number 506d, the UE performs measurements for carrier/cell reselection for a carrier in frequency layer f4 while the EMR timer is running and after the EMR timer expires. As shown by reference number 506e, the UE performs measurements for EMR for a carrier in frequency layer f5 (e.g., a non-overlapping carrier) while the EMR timer is running, and the UE does not perform measurements for the carrier in frequency layer f5 after the EMR timer has expired.

As shown by reference number 508, FIG. 5B shows inter-frequency measurements performed in the frequency layers by the idle/inactive mode UE in a case in which the UE mobility criterion is satisfied for the UE (e.g., $S_{rxlev} \leq S_{nonintraSearchP}$ and $S_{qual} \leq S_{nonintraSearchQ}$). In this case, cell/carrier reselection measurements are performed only for detected carriers/cells in all frequency layers for which cell reselection/mobility measurements are configured (e.g., f1, f2, f3, and f4). As shown by reference numbers 508a and 508d, the UE performs measurements for carrier/cell reselection for carriers in frequency layers f1 and f4 while the EMR timer is running and after the EMR timer expires. As shown by reference numbers 508b and 508c, the UE performs measurements for EMR and carrier/cell reselection for carriers in frequency layers f2 and f3 (e.g., overlapping carriers configured for EMR and cell reselection measurements) while the EMR timer is running, and the UE continues to perform the measurements for carrier/cell reselection for the carriers in frequency layers f2 and f3 after the EMR timer has expired. As shown by reference number 508e, the UE performs measurements for EMR for a carrier in frequency layer f5 (e.g., a non-overlapping carrier) while the EMR timer is running, and the UE does not perform measurements for the carrier in frequency layer f5 after the EMR timer has expired.

As indicated above, FIGS. 5A-5B are provided as an example. Other examples may differ from what is described with respect to FIGS. 5A-5B.

In some examples, UE guidelines (e.g., in a wireless communication standard, such as a 3GPP standard) for UE receive (Rx) beam sweeping and the related UE environment may be based at least in part on an assumption that UEs can receive in one Rx direction at a time. For example, technical specification (TS) 38.133 of the 3GPP standard (e.g., TS 38.133, table 4.2.2.4-1) specified guidelines for FR2 inter-frequency measurement delays for a UE in the RRC idle mode. In accordance with the guidelines regarding FR2 inter-frequency measurement delays specified in TS 38.133, even when only considering a delay ($T_{detect,NR\_Inter}$)

associated with detecting an inter-frequency carrier and a delay ($T_{measure,NR\_Inter}$) associated with performing the inter-frequency measurement, the FR2 measurement delays for the idle mode EMR measurements may be significant. For example, even when measuring only one inter-frequency carrier, with a discontinuous reception (DRX) cycle of 320 ms, the overall delay based on guidelines (e.g., with a scaling factor (N1) of 8) would be equal to DRX cycle*(36*N1*1.5)+(4*N1*1.5)=320*40*8*1.5=153600 ms=153.6 s (approximately 2.5 minutes). Thus, the FR2 measurement delays for idle/inactive mode inter-frequency measurements, such as the EMR measurements, may be very large, and the FR2 measurement delays scale linearly with the number of carriers as the number of carriers increases. This may result in a large measurement cycle for performing the inter-frequency measurements for each carrier, which may result in increased power consumption and decreased battery life for a UE while the UE is in the idle or inactive mode.

Furthermore, in some cases, due at least in part to the nature of FR2 (e.g., beam based communications for both the network node and the UE, and limited and non-uniform spatial coverage), EMR measurement results may be obsolete depending on the time interval between the EMR measurements performed by the UE in the idle or inactive mode and the reporting of the EMR measurements when the UE is switching to the connected mode. This may result in measurements for candidate carriers for CA and/or DC (e.g., for candidate SCells) that are inaccurate at the time of reporting, which may cause a suboptimal SCell (or SCG) to be activated for the UE when the UE establishes an RRC connection with a network node. As a result, the UE may experience unreliable traffic delivery on the suboptimal SCell (or SCG) and/or delays associated with activating a correct SCell (or SCG) for the UE.

Some techniques and apparatuses described herein enable EMR measurement reporting verification for a non-connected mode UE. The UE may perform EMR measurements for a first set of carriers in an EMR time window. The UE may perform at least one verification operation for the EMR measurements based at least in part on at least one carrier measurement in a verification time window. The UE may transmit, to a network node, measurement results associated with the EMR measurements for one or more carriers in the first set of carriers based at least in part on the at least one verification operation. As a result, the likelihood is increased that the EMR measurement results reported when the UE switches to the connected mode are still accurate, which decreases latency associated with configuring and activating an SCell (or SCG) when the UE switches to the connected mode and increased reliability of the traffic delivered via the activated SCell (or SCG).

Some techniques and apparatuses described herein enable grouping of carriers for fast inter-frequency measurements. In some aspects, a UE may receive configuration information indicating multiple target carriers for inter-frequency measurements. The UE may perform, in a first time window, a measurement for cell detection on a reference carrier of a group of carriers of the multiple target carriers. The UE may selectively perform the inter-frequency measurements on the group of carriers in a second time window based at least in part on the cell detection on the reference carrier of the group of carriers. As a result, the total delay for performing the inter-frequency measurements for the group of carriers is reduced, at least by reducing the delays associated with separately performing cell detection for each carrier in the group of carriers. This may reduce the size of the measurement cycle to perform the inter-frequency measurements for the group of carriers, which may reduce power consumption and conserve battery life for the UE.

Figure 6A:
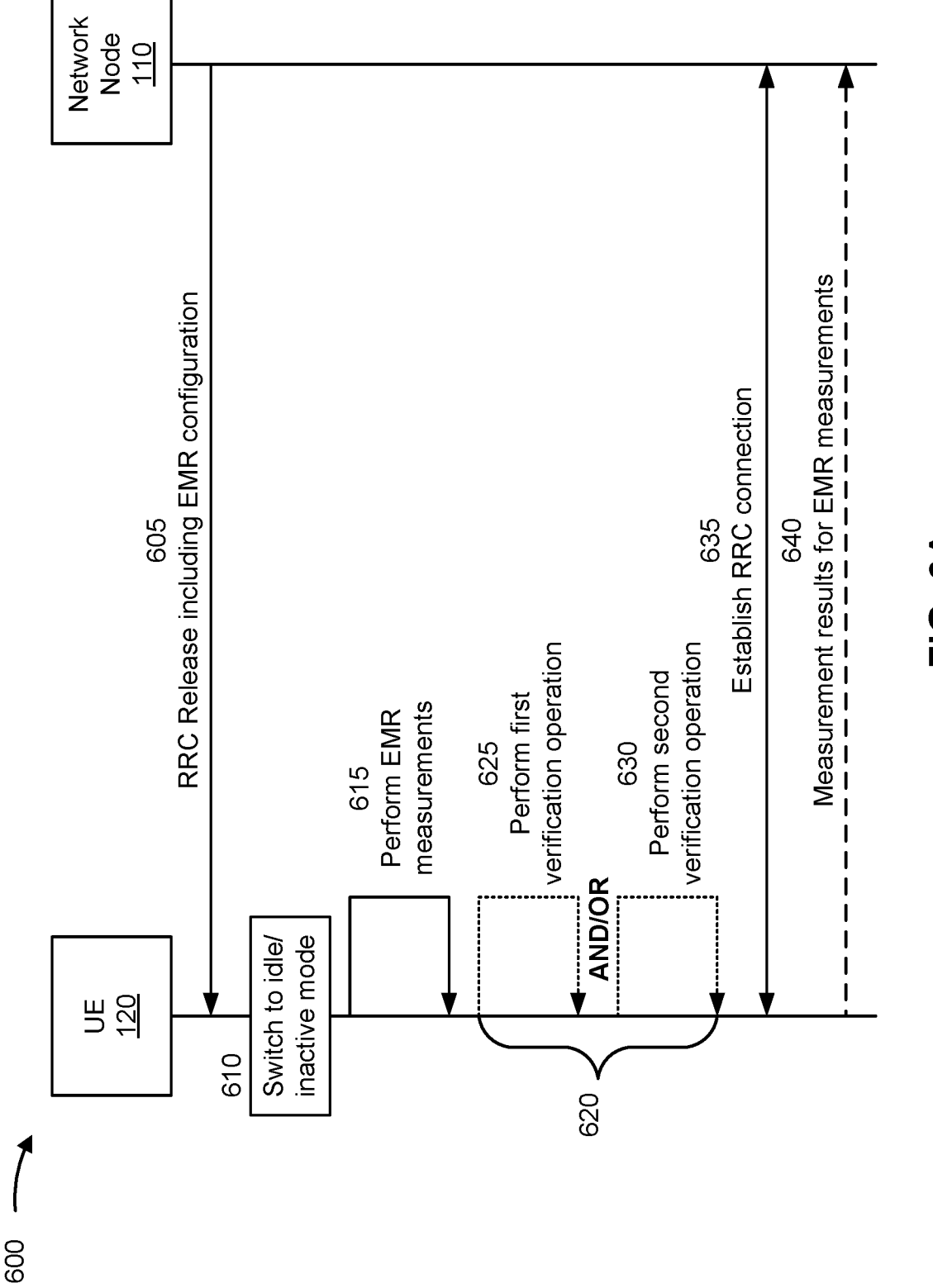
FIGS. 6A-6B are diagrams illustrating an example associated with early measurement reporting verification for a non-connected mode UE, in accordance with the present disclosure.
Figure 6B:
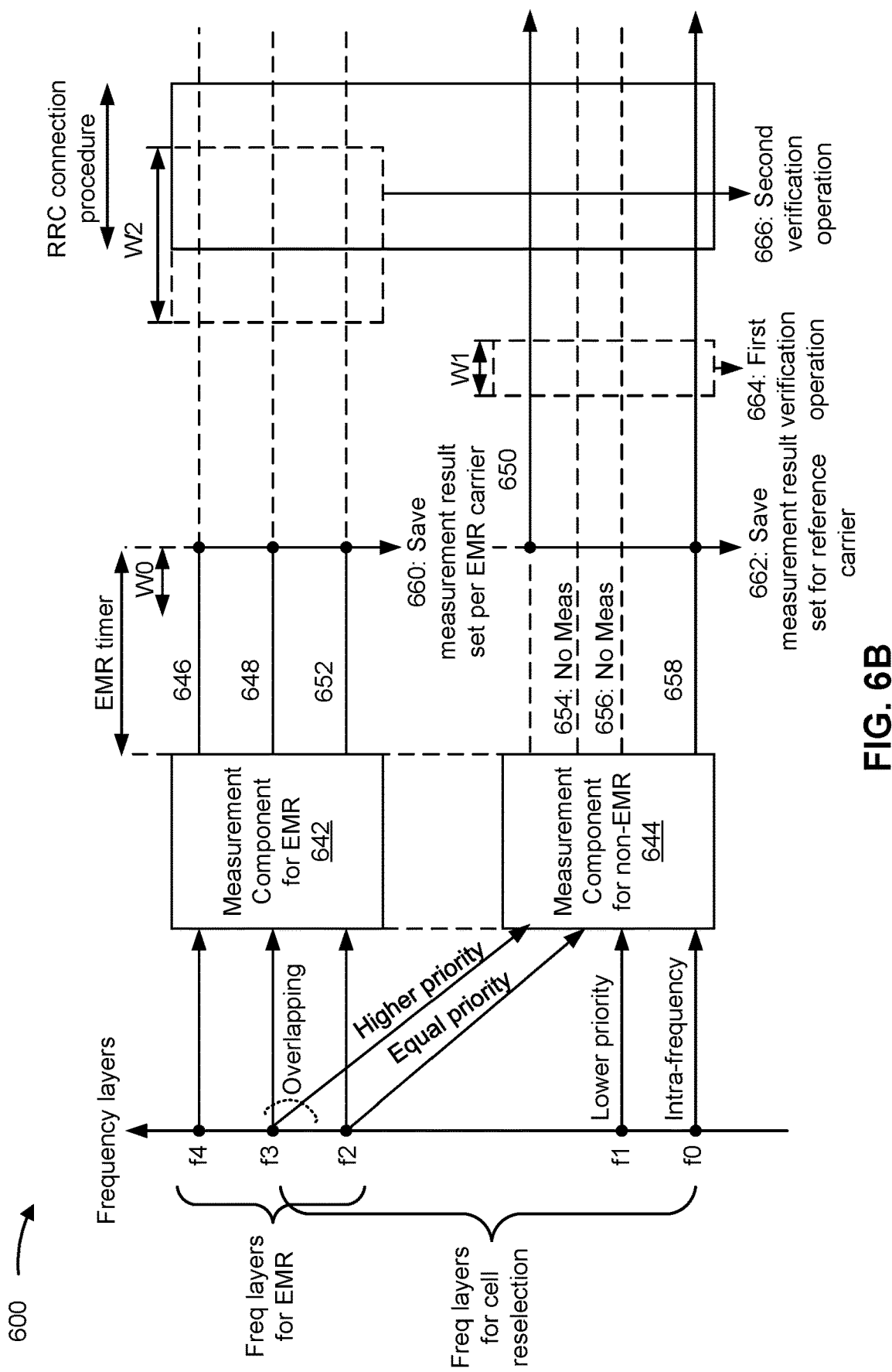

FIGS. 6A-6B are diagrams illustrating an example 600 associated with early measurement reporting verification for a non-connected mode UE, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and UE 120 may communicate via a wireless access link, which may include an uplink and a downlink.

As shown in FIG. 6A, and by reference number 605, the network node 110 may transmit, and the UE 120 may receive, an RRC release message that includes an EMR configuration. The RRC release message may indicate, to the UE 120, that the UE 120 is to switch to an idle mode (e.g., RRC idle) or an inactive mode (e.g., RRC inactive). The RRC release message may include an EMR configuration (e.g., EarlyMeasConfig) that indicates a configuration for EMR measurements to be performed by the UE 120 while operating in the idle or inactive state and a configuration for reporting the EMR measurements. The EMR configuration may include a cell list (or carrier list) that indicates a first set of carriers for which the EMR measurements are configured. The first set of carriers may also be referred to herein as the EMR carriers. In some aspects, the EMR carriers (e.g., the carriers included in the first set of carriers) may be candidate carriers for CA and/or DC. For example, the EMR carriers may be candidate SCells for the UE 120.

In some aspects, the EMR configuration may indicate at least one verification parameter associated with at least one verification operation to be performed for the EMR measurements. For example, the EMR configuration may indicate a first threshold (X) (e.g., a first RSRP threshold and/or a first RSRQ threshold) for a first verification operation and/or a second threshold (Y) (e.g., a second RSRP threshold and/or a second RSRQ threshold) for a second verification operation. Additionally, or alternatively, the EMR configuration may indicate a reference carrier for the first verification operation. In some aspects, a reference cell on the reference carrier can be additionally included in the configuration for the verification operation.

In some aspects, the RRC release message (or another configuration message received by the UE 120) may indicate a configuration for cell reselection measurements to be performed by the UE 120 while the UE 120 is in the idle or inactive mode. For example, the configuration for the cell reselection measurements may configure the UE 120 to determine a second set of carriers for the cell reselection measurements (e.g., cell reselection carriers). For example, the configuration may identify carriers and/or frequencies (e.g., frequency layers) configured for cell reselection measurements, and the configuration may indicate respective cell reselection priorities associated with the frequencies (or the carriers) configured for the cell reselection measurements. The configuration for the cell reselection measurements may also indicate a power threshold (e.g., $S_{nonintraSearchP}$) and/or a quality threshold (e.g., $S_{nonintraSearchQ}$) to be used to determine whether a UE mobility criterion is satisfied for the UE 120.

As further shown in FIG. 6A, and by reference number 610, the UE 120 may switch to the idle mode (e.g., RRC idle) or the inactive mode (e.g., RRC inactive). The UE 120 may switch to the idle mode or the inactive mode in connection with receiving the RRC release message. For example, the RRC release message may trigger the UE 120 to switch to the idle mode or the inactive mode.

As further shown in FIG. 6A, and by reference number 615, the UE 120 may perform EMR measurements for the first set of carriers (e.g., the EMR carriers) in an EMR time window. The UE 120 may perform the EMR measurements for the EMR carriers while the UE 120 is operating in the idle mode or the inactive mode. The UE 120 may perform the EMR measurements for EMR carriers within a time duration associated with an EMR timer. The EMR timer may start when the UE 120 receives the RRC release message and run for the time duration associated with the EMR timer. For example, the EMR timer may be T331 timer. In this case, the EMR timer may be configured (e.g., in the EMR configuration) with a time duration of 10, 30, 60, 120, 180, 240, or 300 seconds. In some aspects, the UE 120 may periodically repeat the EMR measurements on the EMR carriers, in accordance with measurement cycles configured for the EMR measurements, during the time duration associated with the EMR timer. In some aspects, the UE 120 may perform EMR measurements on the EMR carriers in an EMR time window (W0) within the time duration associated with the EMR timer. The EMR time window W0 may be a time window that starts a certain amount of time before the EMR timer expires and ends at the time at which the EMR timer expires. In some aspects, the EMR time window W0 may be the same as the time duration associated with the EMR timer. In some other aspects (e.g., as shown in FIG. 6B), the EMR time window W0 may be different from (e.g., shorter than) the time duration associated with the EMR timer.

The EMR measurements, for each carrier in the first set of carriers (e.g., for each EMR carrier), may include RSRP and/or RSRQ measurements performed on the carrier. In some aspects, the RSRP and/or RSRQ measurements for a carrier may include cell/carrier level RSRP and/or RSRP measurements and/or beam level RSRP and/or RSRQ measurements. For example, the UE 120 may perform beam level RSRP and/or RSRQ measurements for one or more SSBs (e.g., each SSB corresponding to a respective network node transmit (Tx) beam). Additionally, or alternatively, the UE 120 may perform beam level RSRP and/or RSRQ measurements for one or more UE Rx beams per SSB.

In some aspects, the UE 120 may also perform cell reselection measurements for a second set of carriers, while the UE 120 is in the idle mode or the inactive mode. For example, the cell reselection measurements may include RSRP and/or RSRQ measurements for the second set of carriers. The second set of carriers, for which the UE performs the cell reselection measurements, may be based at least in part on a determination of whether the UE mobility criterion is satisfied. For example, the UE mobility criterion may be satisfied when $S_{rxlev} \leq S_{nonintraSearchP}$ and/or $S_{qual} \leq S_{nonintrasearchQ}$. In a case in which the UE mobility criterion is satisfied (e.g., $S_{rxlev} \leq S_{nonintraSearchP}$ and/or $S_{qual} \leq S_{nonintraSearchQ}$), the UE 120 may perform inter-frequency cell reselection measurements for carriers detected in all frequency layers configured for cell reselection (e.g., with all cell reselection priorities) while operating in the idle/inactive state. In a case in which the UE mobility criterion is not satisfied (e.g., $S_{rxlev} > S_{nonintraSearchP}$ and/or $S_{qual} > S_{nonintraSearchQ}$), the UE 120 may perform inter-frequency cell reselection measurements only for carriers detected in frequency layers configured with a higher cell reselection priority than the current serving cell while operating in the idle/inactive state. The UE 120 may always perform intra-frequency cell reselection measurements for carriers in the same frequency layer as the current serving cell.

FIG. 6B shows an example of EMR and cell reselection measurements in a case in which the mobility criterion is not satisfied (e.g., $S_{rxlev} > S_{nonintraSearchP}$ and/or $S_{qual} > S_{nonintraSearchQ}$) for the UE 120. As shown in FIG. 6B, frequency layers f2, f3, and f4 may be frequency layers for EMR. In this case, the first set of carriers (e.g., the EMR carriers) includes carriers deployed in frequency layers f2, f3, and f4. Frequency layers f0, f1, f2, and f3 may be frequency layers for cell reselection. Frequency layer f0 may be a frequency layer of the current serving cell on which the UE 120 is camped while in the idle mode or the inactive mode. Frequency layer f1 may be configured with a lower cell reselection priority than frequency layer f0. Frequency layer f2 may be configured with a cell reselection priority to frequency layer f0. Frequency layer f3 may be configured with a higher cell reselection priority than frequency layer f0. As shown in FIG. 6B, in the case in which the mobility criterion is not satisfied (e.g., $S_{rxlev} > S_{nonintraSearchP}$ and/or $S_{qual} > S_{nonintraSearchQ}$), the second set of carriers, for which cell reselection measurements are performed by the UE 120, may include carriers in frequency layers f0 and f3. In this case, a carrier in frequency layer f3 may be an overlapping carrier included in the first set of carriers (e.g., in frequency layers f2, f3, and f4) for which EMR measurements are performed and in the second set of carriers (e.g., carriers in f0 and f3) for which cell reselection measurements are performed.

As shown in FIG. 6B, the UE 120 may include a measurement component for EMR 642 and a measurement component for non-EMR 644. The measurement component for EMR 642 may perform EMR measurements for the carriers in the first set of carriers while the UE 120 is in the idle mode or the inactive mode. The measurement component for non-EMR 644 may perform cell reselection measurements for the second set of carriers while the UE 120 is in the idle mode or the inactive mode. In some aspects, the measurement component for EMR 642 and the measurement component for non-EMR 644 may be included in measurement component 1008 depicted in FIG. 10.

As shown by reference number 646, the UE 120 (e.g., using the measurement component for EMR 642) may perform EMR measurements (e.g., inter-frequency EMR measurements) for a carrier in frequency layer f4 (or multiple carriers in frequency layer f4) in the time duration associated with the EMR timer. The EMR measurements for the carrier (or carriers) in frequency layer f4 may include one or more EMR measurements in the EMR time window W0. The UE 120 may stop the EMR measurements for the carrier (or carriers) in frequency layer f4 at the end of the time duration associated with the EMR timer.

As shown by reference number 648, the UE 120 (e.g., using the measurement component for EMR 642) may perform measurements (e.g., inter-frequency measurements) for EMR and for cell reselection for a carrier in frequency layer f3 (or multiple carriers in frequency layer f3) in the time duration associated with the EMR timer. For example, the measurement component for EMR 642 may perform EMR measurements for the carrier (or carriers) in frequency layer f3, and the EMR measurements may also be used for the cell reselection measurements. In this case, the measurement component for non-EMR 644 may not perform the cell reselection measurements for the carrier (or carriers) in frequency layer f3 during the time duration associated with the EMR timer, as the measurements performed by the measurement component for EMR may be used as both EMR measurements and cell reselection measurements for the carrier (or carriers) in frequency layer f3. The measurements for EMR and cell reselection for the carrier (or carriers) in frequency layer f3 may include one or more EMR measurements in the EMR time window W0. The measurement component for EMR 642 may stop performing the EMR measurements for the carrier (or carriers) in frequency layer f3 at the end of the time duration associated with the EMR timer. As shown by reference number 650, the UE 120 (e.g., using the measurement component for non-EMR 644) may continue performing cell reselection measurements for the carrier (or carriers) in frequency layer f3 after the end of the time duration associated with the EMR timer.

As shown by reference number 652, the UE 120 (e.g., using the measurement component for EMR 642) may perform EMR measurements (e.g., inter-frequency EMR measurements) for a carrier in frequency layer f2 (or multiple carriers in frequency layer f2) in the time duration associated with the EMR timer. The EMR measurements for the carrier (or carriers) in frequency layer f2 may include one or more EMR measurements in the EMR time window W0. The UE 120 may stop the EMR measurements for the carrier (or carriers) in frequency layer f2 at the end of the time duration associated with the EMR timer. As shown by reference number 654, the UE 120 (e.g., the measurement component for non-EMR 644) may not perform cell reselection measurements for the carrier (or carriers) in frequency layer f2 (e.g., which is configured with an equal cell reselection priority to frequency layer f0) in the case in which the mobility criterion is not satisfied (e.g., $S_{rxlev} > S_{nonintraSearchP}$ and/or $S_{qual} > S_{nonintraSearchQ}$) for the UE 120.

As shown by reference number 656, the UE 120 (e.g., the measurement component for non-EMR 644) may perform no measurements for a carrier (or carriers) in frequency layer f1 (e.g., which is configured with a lower cell reselection priority than frequency layer f0) in the case in which the mobility criterion is not satisfied (e.g., $S_{rxlev} > S_{nonintraSearchP}$ and/or $S_{qual} > S_{nonintrasearchQ}$) for the UE 120. As shown by reference number 658, the UE 120 (e.g., using the measurement component for non-EMR 644) may perform intra-frequency cell reselection measurements for a carrier (e.g., an intra-frequency carrier) in frequency layer f0 (or for multiple intra-frequency carriers in frequency layer f0) during and after the time duration associated with the EMR timer. In some aspects, the intra-frequency cell reselection measurements performed for the intra-frequency carrier (or carriers) in frequency layer f0 may include one or more intra-frequency cell reselection measurements in the EMR time window W0.

As shown by reference number 660, the UE 120 may save, in a memory of the UE 120, per-carrier measurement results for each of the EMR carriers (e.g., for each of the carriers in frequency layers f2, f3, and f4) at an end of the timer duration associated with the EMR timer (e.g., when the EMR timer expires). In some aspects, the measurement results for the EMR measurements may include a measurement result set that indicates, for each carrier, the RSRP and/or RSRQ values measured for different SSB identifiers (SSB-IDs) and different Rx beam identifiers (Rx-beam-IDs). For example, the measurement result set for the EMR measurements may indicate values for (RSRP/Q, SSB-ID, Rx-beam-ID) per EMR carrier/cell.

As shown by reference number 662, the UE 120 may save, in a memory of the UE 120, measurement results for at least one reference carrier in the second set of carriers for which cell reselection measurements are performed (e.g., the carriers in frequency layers f0 and f3) at the end of the timer duration associated with the EMR timer. For example, at least one reference carrier may include at least one of an overlapping inter-frequency carrier included in the first set of carriers and the second set of carriers (e.g., a carrier in frequency layer f3) or an intra-frequency carrier (e.g., a carrier in frequency layer f0). In some aspects, the UE 120 may save measurement results for a set of reference carriers included in the second of carriers. For example, the reference carrier or set of reference carriers for which the measurement results are to be saved may be explicitly indicated by the network node 110 (e.g., in the EMR configuration or other configuration information) or implicitly selected by the UE 120 based at least in part on a rule (e.g., a rule for selecting one or more intra-frequency and/or overlapping frequency carriers). In some aspects, the UE 120 may save, in the memory of the UE 120, measurement results for all of the intra-frequency carriers and/or overlapping carriers. In some aspects, the reference carrier (or carriers) may be a carrier (or carriers) for which at least one measurement (e.g., a measurement for cell reselection) is performed within the EMR time window W0, and the measurement saved for the reference carrier (or carriers) may be a measurement performed within the EMR time window (e.g., a latest measurement performed in the EMR time window). In some aspects, the measurement result for the cell reselection measurements may include values for (RSRP/Q, SSB-ID, Rx-beam-ID) per carrier/cell, for each of one or more reference cells for which the measurement results are saved.

Returning to FIG. 6A, as shown by reference number 620, the UE 120 may perform at least one verification operation for the EMR measurements based at least in part on at least one carrier measurement in a verification time window. The at least one verification operation may include a first verification operation and/or a second verification operation.

As shown by reference number 625, in some aspects, the UE 120 may perform the first verification operation for the EMR measurements. The first verification operation may be based at least in part on a comparison between a first measurement (e.g., a first RSRP or RSRQ measurement) for a reference carrier in the second set of carriers in the EMR time window W0 and a second measurement (e.g., a second RSRP or RSRQ measurement) for the reference carrier in a first verification time window (W/). The reference carrier may be any carrier for which cell reselection measurements are performed by the UE 120 in the idle mode or the inactive mode (e.g., any carrier in the second set of carriers). In some aspects, the reference carrier may be an overlapping carrier included in the first set of carriers (e.g., the EMR carriers) and the second set of carriers. In some aspects, the reference carrier may be an intra-frequency carrier (e.g., in a same frequency layer as the serving cell on which the UE 120 is camped) for which intra-frequency cell reselection measurements are performed by the UE 120 in the idle mode or the inactive mode. For example, the reference carrier/cell may be an overlapping carrier/cell or an intra-frequency carrier/cell because such the UE 120 will already continue to measure such frequencies/cells after the EMR timer expires. In some aspects, the specific frequency/carrier/cell to use for the measurements of the reference carrier in W1 may be based on an explicit configuration (e.g., in the EMR configuration information) or may be autonomously selected by the UE 120. The first measurement for the reference carrier in the EMR time window W0 may be a cell reselection measurement or a measurement that is used for cell reselection and EMR (e.g., in the cast of an overlapping carrier). The second measurement for the reference carrier may be a most recent cell reselection measurement (e.g., an intra-frequency cell reselection measurement or an inter-frequency cell reselection measurement) in the first verification time window W1.

In some aspects, the UE 120, in the first verification operation, may determine whether a difference between the first RSRP or RSRQ measurement for the reference carrier in the EMR time window W0 and the second RSRP or RSRQ measurement for the reference carrier in the first verification time window W1 satisfies (e.g., is less than) a threshold. For example, the UE 120 may determine whether abs[(the most recent RSRP and/or RSRQ in W1)–(the saved value in W0)]≥[X] dB, where Xis the threshold. In some aspects, the value of the threshold Xmay be configured by the network node 110 (e.g., in the EMR configuration). The first verification time window may be a time window of a certain length starting a certain amount of time before an RRC connection procedure for the UE 120.

As shown in FIG. 6B, the reference carrier for the first verification operation may be a carrier in frequency layer f3 (e.g., an overlapping carrier with the set of EMR carriers) or a carrier in frequency layer f0 (e.g., an intra-frequency carrier). The UE 120 (e.g., using the measurement component for non-EMR 644) may perform cell reselection measurements on a carrier (or carriers) in frequency layer f3 and on a carrier (or carriers) in the frequency layer f0 in the first verification time window. As shown by reference number 664, the UE 120 may perform the first verification operation based at least in part on a cell reselection measurement for the reference carrier (e.g., an overlapping carrier in frequency layer f3 or an intra-frequency carrier in frequency layer f0). For example, the UE 120 may compare an RSRP or RSRQ measurement for the reference carrier in W1 with a saved RSRP or RSRQ measurement for the reference carrier in W0 to determine whether the difference between the RSRP or RSRQ measurement in W1 and the saved RSRP or RSRQ measurement satisfies the threshold.

In some aspects, the UE 120 may determine whether or not to transmit the measurement results for the EMR measurements for the first set of carriers to the network node 110 (e.g., during or after the RRC connection procedure) based at least in part on a verification result of the first verification operation. In some aspects, the UE 120 may determine not to transmit the measurement results for the EMR measurements, in connection with a determination that the difference between the first RSRP or RSRQ measurement for the reference carrier in the EMR time window W0 and the second RSRP or RSRQ measurement for the reference carrier in the first verification time window W1 does not satisfy the threshold (e.g., abs[(the most recent RSRP and/or RSRQ in W1)–(the saved value in W0)]≥[X] dB). In some aspects, the at least one verification operation performed by the UE 120 may include only the first verification operation (e.g., without the second verification operation). In this case, the UE 120 may determine to transmit the measurement results for the EMR measurements in connection with a determination that the difference between the first RSRP or RSRQ measurement for the reference carrier in the EMR time window W0 and the second RSRP or RSRQ measurement for the reference carrier in the first verification time window W1 satisfies the threshold (e.g., abs[(the most recent RSRP and/or RSRQ in W1)–(the saved value in W0)]<[X] dB).

In some aspects (e.g., as shown in FIG. 6B), the at least one verification operation performed by the UE 120 may include the first verification operation and the second verification operation. For example, the UE 120 may perform a two-stage verification, in which the UE 120 performs the first verification operation and then proceeds to the second verification operation in connection with a determination that the first verification operation was passed. In this case, the UE 120 may determine to proceed to the second verification operation in connection with a determination that the difference between the first RSRP or RSRQ measurement for the reference carrier in the EMR time window W0 and the second RSRP or RSRQ measurement for the reference carrier in the first verification time window W1 satisfies the threshold (e.g., abs[(the most recent RSRP and/or RSRQ in W1)–(the saved value in W0)]<[X] dB).

Returning to FIG. 6A, as shown by reference number 630, the UE 120 may perform the second verification operation for the EMR measurement. In some aspects, the UE 120 may perform the second verification operation based at least in part on a verification result of the first verification operation. For example, the UE 120 may perform the second verification operation in connection with a determination that the difference between the first RSRP or RSRQ measurement for the reference carrier in the EMR time window W0 and the second RSRP or RSRQ measurement for the reference carrier in the first verification time window W1 satisfies a first threshold (e.g., abs[(the most recent RSRP and/or RSRQ in W1)–(the saved value in W0)]<[X] dB). In some aspects, the at least one verification operation performed by the UE 120 may include only the second verification operation (e.g., without the first verification operation).

The second verification operation may be based at least in part on RSRP or RSRQ measurements for at least a subset of carriers in the first set of carriers in a second verification time window (W2). In some aspects, as shown in FIG. 6B, in a case in which the UE 120 performs the first verification operation and the second verification operation, the first verification time window W1 is a first portion of a total EMR verification time window, and the second verification time window W2 is a second portion of the total EMR verification window. For example, in this case the EMR verification window may be equal to W1+W2. In some aspects, the second verification time window W2 may a time window of a certain duration starting at or after the end of the first verification time window W1. As shown in FIG. 6B, the second verification time window may overlap, in the time domain, with at least a portion of an RRC connection procedure in which the UE 120 is establishing an RRC connection with a network node (e.g., the network node 110) and switching to the RRC connected mode.

In some aspects, in the second verification operation, the UE 120 may perform a per-carrier verification, for each carrier in at least the subset of carriers in the first set of carriers, based at least in part on a comparison of a highest RSRP or RSRQ measurement for the carrier using a quantity (M) of Rx beams in the second verification time window W1 and an RSRP or RSRQ measurement for the carrier in the EMR window. In this case, the UE 120 may determine, for each one or more carriers in the first set of carriers, whether a difference between the highest RSRP or RSRQ measurement for the carrier using the MRx beams in the second verification time window W1 and the RSRP or RSRQ measurement for the carrier in the EMR window satisfies (e.g., is less than) a second threshold (Y). For example, the UE 120 may determine, per carrier, for one or more of the EMR carriers, whether abs[(the highest RSRP and/or RSRQ out of M Rx beams in W2)–(the saved RSRP and/or RSRQ for the same carrier in W0)]≥Y dB. In some aspects, the value of M and the selection of the M Rx beams by the UE 120 may be up to UE implementation and may be based at least in part on an SSB periodicity of the cell. In some aspects, the UE 120 may perform the per-carrier verification for each EMR carrier (e.g., each carrier in the first set of carriers). In some aspects, the UE 120 may perform the per-carrier verification for a subset of EMR carriers (e.g., a subset of the carriers in the first set of carriers) selected based at least in part on the previous measurement results for the EMR measurements performed for the EMR carriers in W0. For example, the subset of EMR carriers may include one or more EMR carriers (e.g., one or more carriers in the first set of carriers) for which the RSRP or RSRQ measurement for the carrier in W0 satisfies a threshold (Z) (e.g., RSRP/Q>Z dB). In some aspects, the UE 120 may determine, for each of the best N SSB-IDs (e.g., with highest measured RSRP or RSRQ values in W0) for a carrier, whether the difference between the highest RSRP or RSRQ measurement for the carrier out of M Rx beams in the verification time window and the RSRP or RSRQ measurement for the carrier in the EMR window satisfies the second threshold (Y). In some aspects, the RSRP and/or RSRQ measurements may be cell level measurements (e.g., measurements derived from beam-specific measurement reported to layer 3 after beam consolidation/selection or measurements after layer 3 filtering for cell quality) or network node Tx beam level measurements (e.g., beam-specific measurements reported by layer 1 to layer 3 after layer 1 filtering or beam-specific measurements after layer 3 beam filtering), depending on a network configuration.

In some aspects, the UE 120 may determine, for each of one or more of the EMR carriers, not to transmit the respective measurement result for the EMR measurements, based at least in part on a determination that the difference between the highest RSRP or RSRQ measurement for the carrier using the M of Rx beams in the second verification time window (W2) and the RSRP or RSRQ measurement for the carrier in the EMR window satisfies the second threshold (Y) (e.g., abs[(the highest RSRP and/or RSRQ out of [M] Rx beams in W2)–(the saved RSRP and/or RSRQ for the same carrier in W0)]<Y dB). In some aspects, the UE 120 may determine, for each of one or more of the EMR carriers, to transmit the respective measurement result for the EMR measurements, based at least in part on a determination that the difference between the highest RSRP or RSRQ measurement for the carrier using the M of Rx beams in the second verification time window W2 and the RSRP or RSRQ measurement for the carrier in the EMR window does not satisfy the second threshold Y (e.g., abs[(the highest RSRP and/or RSRQ out of M Rx beams in W2)–(the saved RSRP and/or RSRQ for the same carrier in W0)]≥Y dB).

As shown by reference number 666 in FIG. 6B, the UE 120 may perform the second verification operation based at least in part on RSRP and/or RSRQ measurements (e.g., performed using the measurement component for EMR 642) for one or more of the EMR carriers (e.g., the carriers in frequency layers f2, f3, and f4) in the second time verification window W2. For example, the UE 120 (e.g., using the measurement component for EMR 642) may perform RSRP measurements using MRx beams, per carrier, for all or a subset of the EMR carriers. The UE 120 may then determine, per carrier, for all or a subset of the EMR carriers, whether abs[(the highest RSRP and/or RSRQ out of M Rx beams in W2)–(the saved RSRP and/or RSRQ for the same carrier in W0)]≥Y dB.

Returning to FIG. 6A, as shown by reference number 635, the UE 120 may establish an RRC connection with the network node 110. The UE 120 may establish the RRC connection with the network node 110 via a random access procedure (e.g., a 4-step RACH procedure). In some aspects, the UE 120 may perform the first verification operation and/or the second verification during the RACH procedure to establish the RRC connection with the network node 110. For example, the UE 120 may initiate the RACH procedure (e.g., by transmitting Msg1 to the network node 110) prior to performing the first verification operation and/or the second verification operation. The UE 120 may switch to the connected mode (e.g., RRC connected) based at least in part on establishing the RRC connection with the network node 110.

As shown by reference number 640, in some aspects, the UE 120 may transmit, to the network node 110, measurement results associated with the EMR measurements for the EMR carriers based at least in part on the at least one verification operation (e.g., the first verification operation and/or the second verification operation). In some aspects, the UE 120 may selectively transmit the measurement results associated with the EMR carriers to the network node 110 based at least in part on the at least one verification operation.

In some aspects, the UE 120 may transmit the measurement results associated with the EMR measurements to the network node 110 based at least in part on the determination, in the first verification operation, that the difference between the first RSRP or RSRQ measurement for the reference carrier in the EMR time window W0 and the second RSRP or RSRQ measurement for the reference carrier in the first verification time window W1 satisfies a first threshold (e.g., abs[(the most recent RSRP and/or RSRQ in W1)–(the saved value in W0)]<X dB). In some aspects, the UE 120 may transmit the measurement results associated with the EMR measurements to the network node 110 based at least in part on the determination in the second verification operation. In some aspects, the UE 120 may transmit a respective measurement result associated with the EMR measurements for each of one or more of the EMR carriers, based at least in part on a determination, in the second verification operation, that the difference between the highest RSRP or RSRQ measurement for the carrier using MRx beams in the second verification time window W2 and the RSRP or RSRQ measurement for the carrier in the EMR window W0 satisfies the second threshold Y (e.g., abs[(the highest RSRP and/or RSRQ out of M Rx beams in W2)–(the saved RSRP and/or RSRQ for the same carrier in W0)]<Y dB). In this case, the UE 120 may report the most recent measurement results for the EMR carriers in W2 or the saved EMR measurement results in W0.

In some aspects, the UE 120 may select to transmit the measurement results associated with the EMR measurements based at least in part on a first verification result of the first verification operation and/or a second verification result of the second verification operation. In this case, the first verification result may correspond to the EMR measurements being verified by the first verification operation (e.g., passing the first verification operation), and the second verification result may correspond to the EMR measurements being verified by the second verification operation (e.g., passing the second verification operation). In some aspects, in a case in which the UE 120 selects to transmit the measurement results associated with the EMR measurements, the UE 129 may transmit the measurement result to the network node 110 during or after the RACH procedure to establish the RRC connection between the UE 120 and the network node 110. For example, in a case in which the UE 120 switches from the inactive mode to the connected mode, the UE 120 may receive, from the network node 110, a request for measurement reporting in an RRC resume message (e.g., Msg4) in the RACH procedure, and the UE 120 may transmit the measurement results associated with the EMR measurements in one or more EMRs in an RRC resume complete message (e.g., Msg5) in the RACH procedure. In some aspects, in a case in which the UE 120 switches from the idle mode or the inactive mode to the connected mode, the UE 120 may transmit, to the network node 110 in the RACH procedure, an RRC setup complete message or an RRC resume complete message (e.g., Msg5) that includes an indication that a measurement report is available. In this case, the network node 110 may transmit, to the UE 120, a UE information request including a measurement report request, and the UE 120 may transmit, to the network node 110, the measurement results associated with the EMR measurements in one or more EMRs in a UE information response.

In some aspects, the UE 120 may determine that one or more EMR measurements did not pass at least one of the first verification operation or the second verification operation. For example, the UE 120 may determine that the EMR measurements did not pass the first verification operation based at least in part on a determination, in the first verification operation, that the difference between the first RSRP or RSRQ measurement for the reference carrier in the EMR time window W0 and the second RSRP or RSRQ measurement for the reference carrier in the first verification time window W1 does not satisfy a first threshold (e.g., abs[(the most recent RSRP and/or RSRQ in W1)–(the saved value in W0)]≥X dB). The UE 120 may determine that the one or more EMR measurements did not pass the second verification operation based at least in part on a determination, in the second verification operation, that the difference between the highest RSRP or RSRQ measurement for the carrier using M of Rx beams in the second verification time window W2 and the RSRP or RSRQ measurement for the carrier in the EMR window W0 does not satisfy the second threshold (e.g., abs[(the highest RSRP and/or RSRQ out of M Rx beams in W2)–(the saved RSRP and/or RSRQ for the same carrier in W0)]≥Y dB). In some aspects, the UE 120 may refrain from transmitting the measurement results associated with the EMR measurements for one or more EMR carriers based at least in part on the determination that the EMR measurements did not pass at least one of the first verification operation or the second verification operation. In this case, the UE 120 may drop the EMR configured for reporting the EMR measurements. In some aspects, in a case in which the UE 120 drops an EMR, the UE 120 may transmit, to the network node 110, an explicit indication that the EMR is dropped instead of transmitting the EMR to the network node 110. In some aspects, based at least in part on a determination that the EMR measurements for one or more EMR carriers did not pass at least one of the first verification operation or the second verification operation, the UE 120 may transmit, to the network node 110, the EMR including the measurement results for EMR measurements, together with an indication (e.g., a flag) that indicates that the EMR measurements have not passed verification.

In some aspects, the operations described above in connection with FIGS. 6A-6B may be similarly applied to verify measurements performed by a UE 120 operating in any RRC state (e.g., RRC idle, RRC inactive, and/or RRC connected). For example, in some aspects, the operations described above may be similarly applied to validate measurements performed by the UE 120 while operating in the RRC connected mode, in a case in which an interval between the measurement instance and the measurement result reporting instance satisfies (e.g., is greater than or equal to) a certain threshold. In this case, W0 may be redefined as a time window of a certain duration ending at a slot in which a last measurement resource is received prior to when the corresponding result is scheduled to be reported. In this case, W1 may be redefined as a time window of a certain duration that begins before the reporting instance. In this case, W2 may be redefined as a time window of a certain duration starting at or after the end of W1.

As indicated above, FIGS. 6A-6B are provided as an example. Other examples may differ from what is described with respect to FIGS. 6A-6B.

Figure 7A:
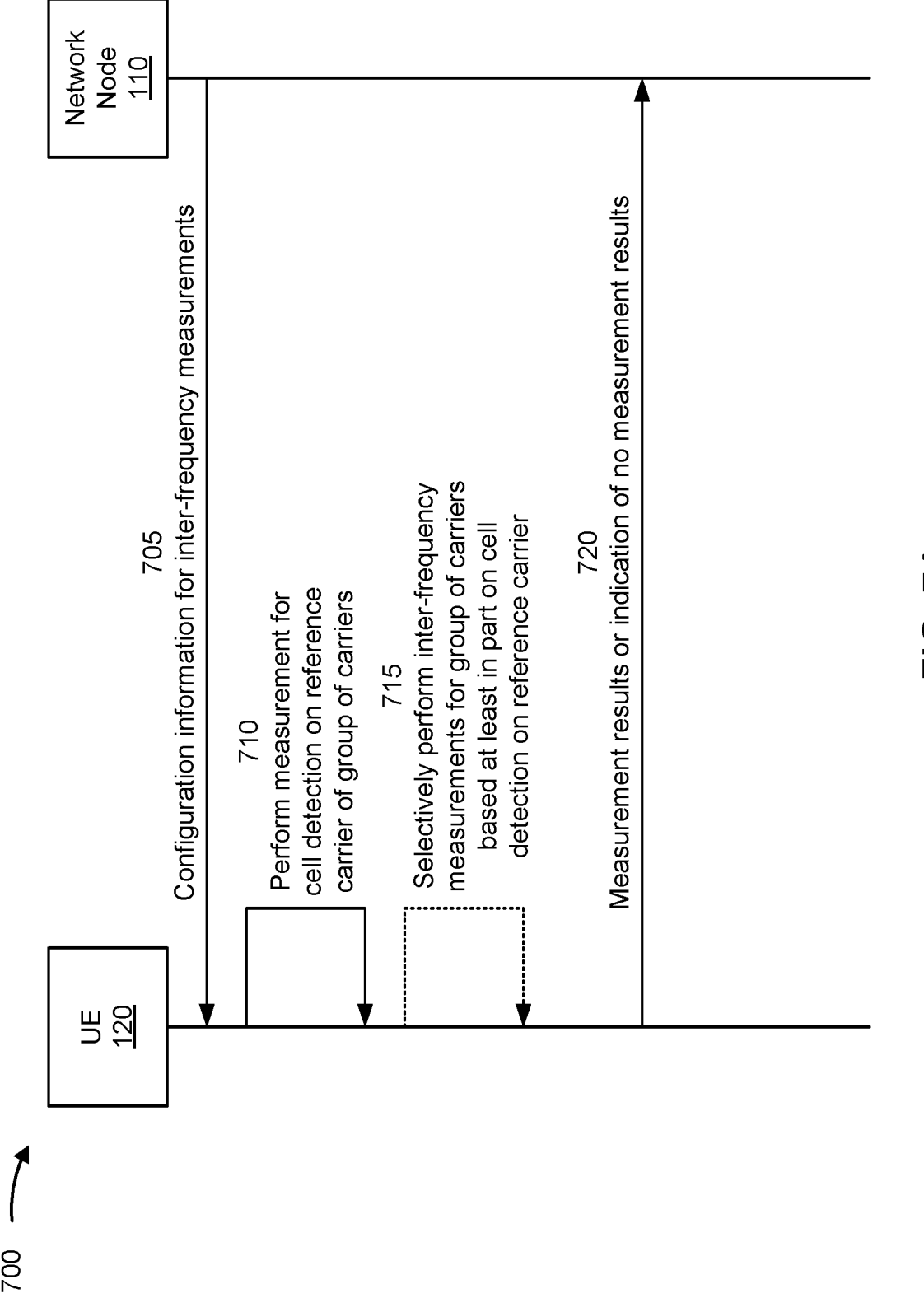
FIGS. 7A-7B are diagrams illustrating an example associated with grouping carriers for fast cell measurements, in accordance with the present disclosure.
Figure 7B:
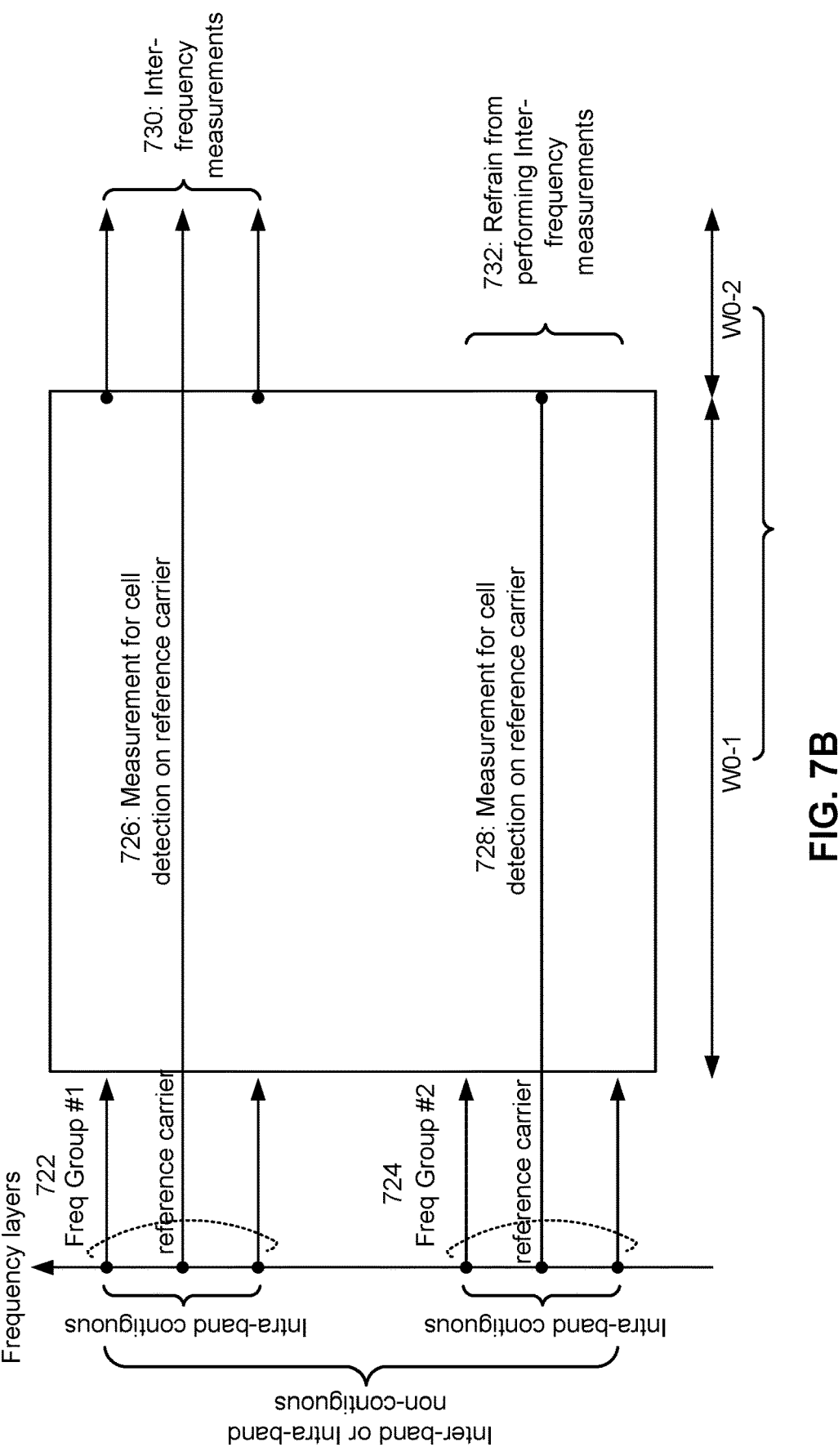

FIGS. 7A-7B are diagrams illustrating an example 700 associated with grouping carriers for fast cell measurements, in accordance with the present disclosure. As shown in FIG. 7A, example 700 includes communications between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 7A, and by reference number 705, the network node 110 may transmit, and the UE 120 may receive, configuration information for inter-frequency measurements. In some aspects, the configuration information may indicate multiple target carriers for the inter-frequency measurements. In some aspects, the configuration information may be included in an RRC message. In some aspects, the inter-frequency measurements may be EMR measurements to be performed by the UE 120 in the idle mode or the inactive mode. In this case, the configuration information for the EMR measurements may be included in an RRC release message that triggers the UE 120 to switch from the connected mode to the idle mode or the inactive mode. In some aspects, the inter-frequency measurements may include inter-frequency cell reselection measurements to be performed by the UE 120 in the idle mode or the inactive mode. In some aspects, the inter-frequency measurements may be inter-frequency measurements to be performed in a connected mode (e.g., an RRC connected mode).

The multiple target carriers may be target carriers for which to perform the inter-frequency measurements (e.g., inter-frequency EMR measurements and/or inter-frequency cell reselection measurements). In some aspects, the UE 120 may be configured with one or more groups of target carriers. In some aspects, the grouping of the target carriers for the inter-frequency measurements may be explicitly signaled to the UE 120 from the network node 110. For example, the configuration information may indicate the one or more groups of target carriers. In this case, the configuration information may indicate which of the multiple target carriers are in each group of target carriers. In some aspects, the configuration may not explicitly indicate the groups of target carriers. In this case, the groups of target carriers may be implicitly determined or selected by the UE 120 based at least in part on the frequency location of the target carriers/cells for the inter-frequency measurements. For example, carriers in a group may be intra-band carriers in a same frequency band, or carriers in a group may be intra-band contiguous carriers in contiguous frequencies in the same frequency band.

As shown in FIG. 7B, the target carriers may be FR2 carriers, and the groups of target carrier may include a first group of target carriers (Freq Group #1) (shown by reference number 722) and a second group of target carriers (Freq Group #2) (shown by reference number 724). The first group may include a first set of intra-band contiguous carriers, and the second group may include a second set of intra-band contiguous carriers. In some aspects, the first group of target carriers and the second group of target carriers may be inter-band groups of target carriers. For example, the first group may be a set of intra-band contiguous carriers in a first frequency band, and the second group may be a set of intra-band contiguous carriers in a second frequency band. Alternatively, the first group of target carriers and the second group of target carriers may be intra-band non-contiguous groups of target carriers. For example, the first group may be a first set of intra-band contiguous carriers in a frequency band, and the second group may be a second set of intra-band contiguous carriers in the same frequency band as the first group, but not contiguous to the first group.

In some aspects, a measurement cycle for one group of target frequencies may be differently configured from a measurement cycle for another group of target frequencies. For example, the first group of target frequencies in FIG. 7B may be configured with a first measurement cycle that is different from a second measurement cycle configured for the second group of target frequencies in FIG. 7B. In some aspects, the configuration information may include measurement configurations for the groups of target carriers, and the measurement configurations may indicate the configuration of the measurement cycle for each group. For example, the measurement configuration may be common within a group of target carriers, but may be different for different groups of target carriers.

In some aspects, each group of target carriers may have a reference carrier (or reference cell). In some aspects, the reference carrier in a group of carriers may be indicated by signaling from the network node 110 to the UE 120. For example, the configuration information may indicate the reference carrier for each group of carriers. In some aspects, the UE 120 may autonomously select the reference carrier for a group from the target carriers in the group. As shown in FIG. 7B, a middle carrier of the first group is the reference carrier of the first group, and a middle carrier of the second group is the reference carrier of the second group.

Returning to FIG. 7A, as shown by reference number 710, the UE 120 may perform, in a first time window (W0-1), a measurement for cell detection on a reference carrier in a group of target carriers. In some aspects, in the first time window W0-1, the UE 120 may perform the measurement only for the reference carrier within the group of target carriers. The measurement may only include cell detection of the reference carrier (e.g., the reference target carrier). In some aspects, the UE 120 may be able to perform the measurement of the reference carrier at a high rate within the first time window W0-1.

In some aspects, the UE 120 may perform the measurement for cell detection on the reference cell in the first time window W0-1 per group, for each group of target carriers. As shown by reference number 726 in FIG. 7B, the UE 120 may perform a measurement for cell detection on the reference carrier of the first group of target carriers in the first time window W0-1. As shown by reference number 728, the UE 120 may perform a measurement for cell detection on the reference carrier of the second group of target carriers in the first time window W0-1. In some aspects, the measurement cycle for the first time window W0-1 may be configured differently for different groups (e.g., for the first group and the second group in FIG. 7B).

Returning to FIG. 7A, as shown by reference number 715, the UE 120 may selectively perform inter-frequency measurements for a group of target carriers in a second time window (W0-2) based at least in part on the cell detection on the reference carrier of the group of target carriers. In some aspects, for a group of target carriers, if the reference carrier/cell is not detected within the duration of the first time window W0-1, the UE 120 may not continue performing the inter-frequency measurements for the other carriers in the group in the second time window W0-2. For example, the UE 120 may refrain from performing (e.g., select not to perform) the inter-frequency measurements on the group of target carriers in the second time window W0-2 in connection with a determination that a cell is not detected on the reference carrier in the first time window W0-1. Additionally, or alternatively, the UE 120 may refrain from performing the inter-frequency measurements on the group of target carriers in the second time window W0-2 in connection with a determination that a signal strength of the cell detected on the reference carrier in the first time window W0-1 does not satisfy (e.g., is less than or equal to) a threshold.

In some aspects, if the reference carrier/cell is detected within the duration of the first time window W0-1, the UE 120 may proceed with performing (e.g., select to perform) the inter-frequency frequency measurements for the target carriers in the group in the second time window W0-2. For example, the UE 120 may perform the inter-frequency measurements on the group of carriers in the second time window W0-2 in connection with a determination that a cell is detected on the reference carrier with a signal strength above a threshold in the first time window W0-1. When the UE 120 successfully detects the cell on the reference carrier, the UE 120 may obtain automatic gain control (AGC) information, time and frequency synchronization information, UE Rx beam information, and network node Tx beam information (e.g., SSB-ID) from the detected cell on the reference carrier. In some aspects, the UE 120 may perform the inter-frequency measurements on the target carriers in the group based at least in part on the obtained AGC, time and frequency synchronization information, and/or UE 120 Rx beam information from the reference carrier. In some cases, the network node Tx beam information (e.g., SSB-ID) from the cell detected on the reference carrier may be different from network node Tx beams for the other target carriers in the group. In some other cases, depending on the network configuration, the network node Tx beam (e.g., SSB-ID) may be assumed to be common for all carriers in the group of target carriers. In this case, the UE 120 may perform the inter-frequency measurements based at least in part on the network node Tx beam (e.g., SSB-ID) determined from the reference cell.

In some aspects, the UE 120 may select whether to perform or refrain from performing the inter-frequency measurements in the second time window W0-2, per group, for each group of target carriers, based at least in part on the cell detection on the respective reference carrier in the first time window W0-1 for each group of carriers. As shown in FIG. 7B, and by reference number 730, the UE 120 may perform the inter-frequency measurements for the first group of target carriers in the second time window W0-2 in connection with detecting the cell (e.g., with a signal strength greater than a threshold) on the reference carrier in the first time window W0-1. As shown by reference number 732, the UE 120 may refrain from performing the inter-frequency measurements for the second group of target carriers in the second time window W0-2 in connection with a determination that no cell (e.g., with a signal strength greater than a threshold) was detected on the reference carrier in the first time window W0-2.

In some aspects, different measurement cycles may be configured for the first time window W0-1 and the second time window W0-2. In some aspects, in a case in which the configured inter-frequency measurements are inter-frequency EMR measurements to be performed by the UE 120 while the UE 120 is operating in an idle mode or an inactive mode, the operations described in connection with FIGS. 7A-7B may be performed together with the operations described in connection with FIGS. 6A-6B. For example, the EMR measurements in the EMR window W0 and/or the EMR timer duration may be performed as described in connection with FIGS. 7A-7B. In this case, W0-1 and W0-2 may be first and second portions of the EMR window W0 or first and second portions of the EMR timer duration.

Returning to FIG. 7A, as shown by reference number 720, the UE 120 may transmit, to the network node 110, measurement results for inter-frequency measurements performed for a group of target carriers or an indication of no measurement results for the group of target carriers. In some aspects, when the UE 120 performs the inter-frequency measurements for a group of carriers in the second time window W0-2, the UE 120 may transmit, and the network node 110 may receive, an indication of the inter-frequency measurements performed on the group of target carriers. For example, the UE 120 may transmit, to the network node 110, a measurement report (e.g., an EMR or another measurement report) that includes measurement results for the inter-frequency measurements performed on the group of target carriers.

In some aspects, when the UE 120 refrains from performing the inter-frequency measurements on a group of target carriers in the second time window (W0-2), the UE 120 may refrain from transmitting inter-frequency measurements for the group of target carriers to the network node 110. For example, the UE 120 may drop a measurement report configured for reporting the inter-frequency measurements for the group of target carriers. In some aspects, when the UE 120 refrains from transmitting inter-frequency measurements for a group of target carriers to the network node 110, the UE 120 may transmit, to the network node 110, instead of the measurement report, an indication that the inter-frequency measurements were not performed for the group of carriers (e.g., in a certain measurement occasion). For example, the indication may indicate that the measurement report for the inter-frequency measurements for the group of carriers has been dropped by the UE 120.

In some aspects, when the UE 120 refrains from performing the inter-frequency measurements on a group of target carriers in the second time window W0-2, the UE 120 may transmit (e.g., in a measurement report) previous measurements (e.g., performed in a previous measurement occasion) for the group of target carriers. In this case, the UE 120 may transmit the measurement report, together with an indication (e.g., a flag) that indicates that the measurements are old and/or that the UE 120 did not perform the inter-frequency measurements in the measurement occasion for which the measurements are being reported.

In some aspects, the UE 120 may continue monitoring the reference carrier of a group, while selectively skipping the inter-frequency measurements for other target carriers in the group based at least in part on the measurement of the reference carrier. For example, the UE 120 may, after performing inter-frequency measurements on a group of carriers in a first measurement occasion, perform a measurement (e.g., an RSRP or RSRQ measurement) on the reference carrier in a second measurement occasion. The UE 120 may compare the value of the measurement (e.g., the RSRP or RSRQ value) on the reference carrier in the second measurement occasion with the value of a previous measurement (e.g., a previous RSRP or RSRQ value) on the reference carrier in the first measurement occasion, and the UE 120 may refrain from performing the inter-frequency measurements for the group of target carriers in the second measurement occasion based at least in part on a difference between the measurement values on the reference carrier in the second measurement occasion and the first measurement occasion being less than or equal to a threshold.

As indicated above, FIGS. 7A-7B are provided as an example. Other examples may differ from what is described with respect to FIGS. 7A-7B.

FIG. 8 is a diagram illustrating an example process 800 performed, for example, by a UE, in accordance with the present disclosure. Example process 800 is an example where the UE (e.g., UE 120) performs operations associated with early measurement reporting verification for a non-connected mode UE.

As shown in FIG. 8, in some aspects, process 800 may include performing EMR measurements for a first set of carriers in an EMR time window (block 810). For example, the UE (e.g., using communication manager 140 and/or measurement component 1008, depicted in FIG. 10) may perform EMR measurements for a first set of carriers in an EMR time window, as described above.

As further shown in FIG. 8, in some aspects, process 800 may include performing at least one verification operation for the EMR measurements based at least in part on at least one carrier measurement in a verification time window (block 820). For example, the UE (e.g., using communication manager 140 and/or verification component 1010, depicted in FIG. 10) may perform at least one verification operation for the EMR measurements based at least in part on at least one carrier measurement in a verification time window, as described above.

As further shown in FIG. 8, in some aspects, process 800 may include transmitting, to a network node, measurement results associated with the EMR measurements for one or more carriers in the first set of carriers based at least in part on the at least one verification operation (block 830). For example, the UE (e.g., using communication manager 140 and/or transmission component 1004, depicted in FIG. 10) may transmit, to a network node, measurement results associated with the EMR measurements for one or more carriers in the first set of carriers based at least in part on the at least one verification operation, as described above.

Process 800 may include additional aspects, such as any single aspect or any combination of aspects described below and/or in connection with one or more other processes described elsewhere herein.

In a first aspect, performing the EMR measurements for the first set of carriers in the EMR time window includes performing the EMR measurements for the first set of carriers in the EMR time window while operating in an idle or inactive mode.

In a second aspect, alone or in combination with the first aspect, process 800 includes performing cell reselection measurements for a second set of carriers, wherein the cell reselection measurements include at least one of RSRP or RSRQ measurements for the second set of carriers, and performing the at least one verification operation for the EMR measurements includes performing a first verification operation based at least in part on a comparison between a first RSRP or RSRQ measurement for a reference carrier of the second set of carriers in the EMR time window and a second RSRP or RSRQ measurement for the reference carrier in the verification time window.

In a third aspect, alone or in combination with one or more of the first and second aspects, the reference carrier of the second set of carriers is an overlapping carrier included in the first set of carriers and the second set of carriers or an intra-frequency carrier included in the second set of carriers.

In a fourth aspect, alone or in combination with one or more of the first through third aspects, transmitting the measurement results associated with the EMR measurements for one or more carriers in the first set of carriers includes transmitting measurement result sets resulting in the EMR measurements in the EMR time window for the carriers in the first set of carriers based at least in part on a difference between the first RSRP or RSRQ measurement for the reference carrier and the second RSRP or RSRQ measurement for the reference carrier satisfying a threshold in the first verification operation.

In a fifth aspect, alone or in combination with one or more of the first through fourth aspects, performing the at least one verification operation for the EMR measurements further includes performing, in connection with a difference between the first RSRP or RSRQ measurement for the reference carrier and the second RSRP or RSRQ measurement for the reference carrier satisfying a first threshold in the first verification operation, a second verification operation based at least in part on RSRP or RSRQ measurements for at least a subset of carriers in the first set of carriers in the verification time window.

In a sixth aspect, alone or in combination with one or more of the first through fifth aspects, the second RSRP or RSRQ measurement for the reference carrier is performed in a first portion of the verification time window, and the RSRP or RSRQ measurements for at least the subset of carriers in the first set of carriers are performed in a second portion of the verification time window.

In a seventh aspect, alone or in combination with one or more of the first through sixth aspects, performing the second verification operation includes performing, for each carrier in at least the subset of carriers in the first set of carriers, a per-carrier verification based at least in part on a comparison of a highest RSRP or RSRQ measurement for the carrier using a quantity of receive beams in the verification time window and an RSRP or RSRQ measurement for the carrier in the EMR window.

In an eighth aspect, alone or in combination with one or more of the first through seventh aspects, performing the second verification operation includes performing the per-carrier verification for each carrier in the first set of carriers.

In a ninth aspect, alone or in combination with one or more of the first through eighth aspects, performing the second verification operation includes performing the per-carrier verification for each carrier in the subset of carriers, wherein the subset of carriers includes one or more carriers, in the first set of carriers, for which the RSRP or RSRQ measurement for the carrier satisfies a threshold.

In a tenth aspect, alone or in combination with one or more of the first through ninth aspects, for each cell in at least the subset of carriers in the first set of carriers, the quantity of the receive beams is based at least in part on an SSB periodicity for the carrier, and the receive beams included in the quantity of receive beams are based at least in part on the EMR measurements in the EMR time window.

In an eleventh aspect, alone or in combination with one or more of the first through tenth aspects, transmitting the measurement results associated with the EMR measurements for one or more carriers in the first set of carriers includes transmitting, for each of the one or more carriers, a respective measurement result associated with the EMR measurements based at least in part on a difference between the highest RSRP or RSRQ measurement for the carrier using the quantity of receive beams in the verification time window and the RSRP or RSRQ measurement for the carrier in the EMR window satisfying a second threshold.

In a twelfth aspect, alone or in combination with one or more of the first through eleventh aspects, the EMR measurements include at least one of RSRP or RSRQ measurements for the first set of carriers, and performing the at least one verification operation for the EMR measurements includes performing, for at least a subset of carriers in the first set of carriers, per-carrier verification based at least in part on RSRP or RSRQ measurements in the verification time window for at least the subset of carriers in the first set of carriers.

In a thirteenth aspect, alone or in combination with one or more of the first through twelfth aspects, for each carrier in at least the subset of carriers in the first set of carriers, the per-carrier verification is based at least in part on a comparison of a highest RSRP or RSRQ measurement for the carrier using a quantity of receive beams in the verification time window and an RSRP or RSRQ measurement for the carrier in the EMR window.

In a fourteenth aspect, alone or in combination with one or more of the first through thirteenth aspects, performing the per-carrier verification includes performing the per-carrier verification for each carrier in the first set of carriers.

In a fifteenth aspect, alone or in combination with one or more of the first through fourteenth aspects, performing the per-carrier verification includes performing the per-carrier verification for each carrier in the subset of carriers, wherein the subset of carriers includes one or more carriers, in the first set of carriers, for which the RSRP or RSRQ measurement for the carrier satisfies a threshold.

In a sixteenth aspect, alone or in combination with one or more of the first through fifteenth aspects, transmitting the measurement results associated with the EMR measurements for one or more carriers in the first set of carriers includes transmitting, for each of the one or more carriers, a respective measurement result associated with the EMR measurements based at least in part on a difference between the highest RSRP or RSRQ measurement for the carrier using the quantity of receive beams in the verification time window and the RSRP or RSRQ measurement for the carrier in the EMR window satisfying a threshold.

In a seventeenth aspect, alone or in combination with one or more of the first through sixteenth aspects, process 800 includes receiving, from the network node, an indication of the first set of carriers for which the EMR measurements are to be performed and an indication of at least one verification parameter associated with the at least one verification operation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with grouping carriers for fast cell measurements.

As shown in FIG. 9, in some aspects, process 900 may include receiving configuration information indicating multiple target carriers for inter-frequency measurements (block 910). For example, the UE (e.g., using communication manager 140 and/or reception component 1002, depicted in FIG. 10) may receive configuration information indicating multiple target carriers for inter-frequency measurements, as described above.

As further shown in FIG. 9, in some aspects, process 900 may include performing, in a first time window, a measurement for cell detection on a reference carrier of a group of carriers of the multiple target carriers (block 920). For example, the UE (e.g., using communication manager 140 and/or measurement component 1008, depicted in FIG. 10) may perform, in a first time window, a measurement for cell detection on a reference carrier of a group of carriers of the multiple target carriers, as described above.

As further shown in FIG. 9, in some aspects, process 900 may include selectively performing the inter-frequency measurements on the group of carriers in a second time window based at least in part on the cell detection on the reference carrier of the group of carriers (block 930). For example, the UE (e.g., using communication manager 140 and/or selection component 1012, depicted in FIG. 10) may selectively perform the inter-frequency measurements on the group of carriers in a second time window based at least in part on the cell detection on the reference carrier of the group of carriers, as described above.

Process 900 may include additional aspects, such as any single aspect or any combination of aspects described below and/or in connection with one or more other processes described elsewhere herein.

In a first aspect, selectively performing the inter-frequency measurements on the group of carriers includes performing the inter-frequency measurements on the group of carriers in the second time window in connection with a determination that a cell is detected on the reference carrier with a signal strength above a threshold in the first time window.

In a second aspect, alone or in combination with the first aspect, performing the inter-frequency measurements on the group of carriers in the second time window includes performing the inter-frequency measurements on the group of carriers using at least one of AGC, time and frequency synchronization information, UE receive beam information, or network node transmit beam information determined based at least in part on the reference carrier of the group of carriers.

In a third aspect, alone or in combination with one or more of the first and second aspects, process 900 includes transmitting, to a network node, an indication of the inter-frequency measurements performed on the group of carriers.

In a fourth aspect, alone or in combination with one or more of the first through third aspects, selectively performing the inter-frequency measurements on the group of carriers includes refraining from performing the inter-frequency measurements on the group of carriers in the second time window in connection with a determination that a cell is not detected on the reference carrier with a signal strength above a threshold in the first time window.

In a fifth aspect, alone or in combination with one or more of the first through fourth aspects, process 900 includes refraining from transmitting an indication of the inter-frequency measurements for the group of carriers to a network node.

In a sixth aspect, alone or in combination with one or more of the first through fifth aspects, process 900 includes transmitting, to a network node, an indication that the inter-frequency measurements were not performed on the group of carriers in the second time window.

In a seventh aspect, alone or in combination with one or more of the first through sixth aspects, the configuration information indicates the carriers, of the multiple target carriers, included in the group of carriers.

In an eighth aspect, alone or in combination with one or more of the first through seventh aspects, the configuration information indicates the reference carrier of the group of carriers.

In a ninth aspect, alone or in combination with one or more of the first through eighth aspects, the group of carriers includes a group of intra-band or intra-band contiguous carriers of the multiple target carriers.

In a tenth aspect, alone or in combination with one or more of the first through ninth aspects, the first time window and the second time window are in a first measurement occasion for the group of carriers, and process 900 includes performing a measurement on the reference carrier of the group of carriers in a second measurement occasion, and refraining from performing inter-frequency measurements for carriers, other than the reference carrier, in the group of carriers in the second measurement occasion based at least in part on a comparison of the measurement on the reference carrier in the second measurement occasion and the measurement on the reference carrier in the first measurement occasion.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
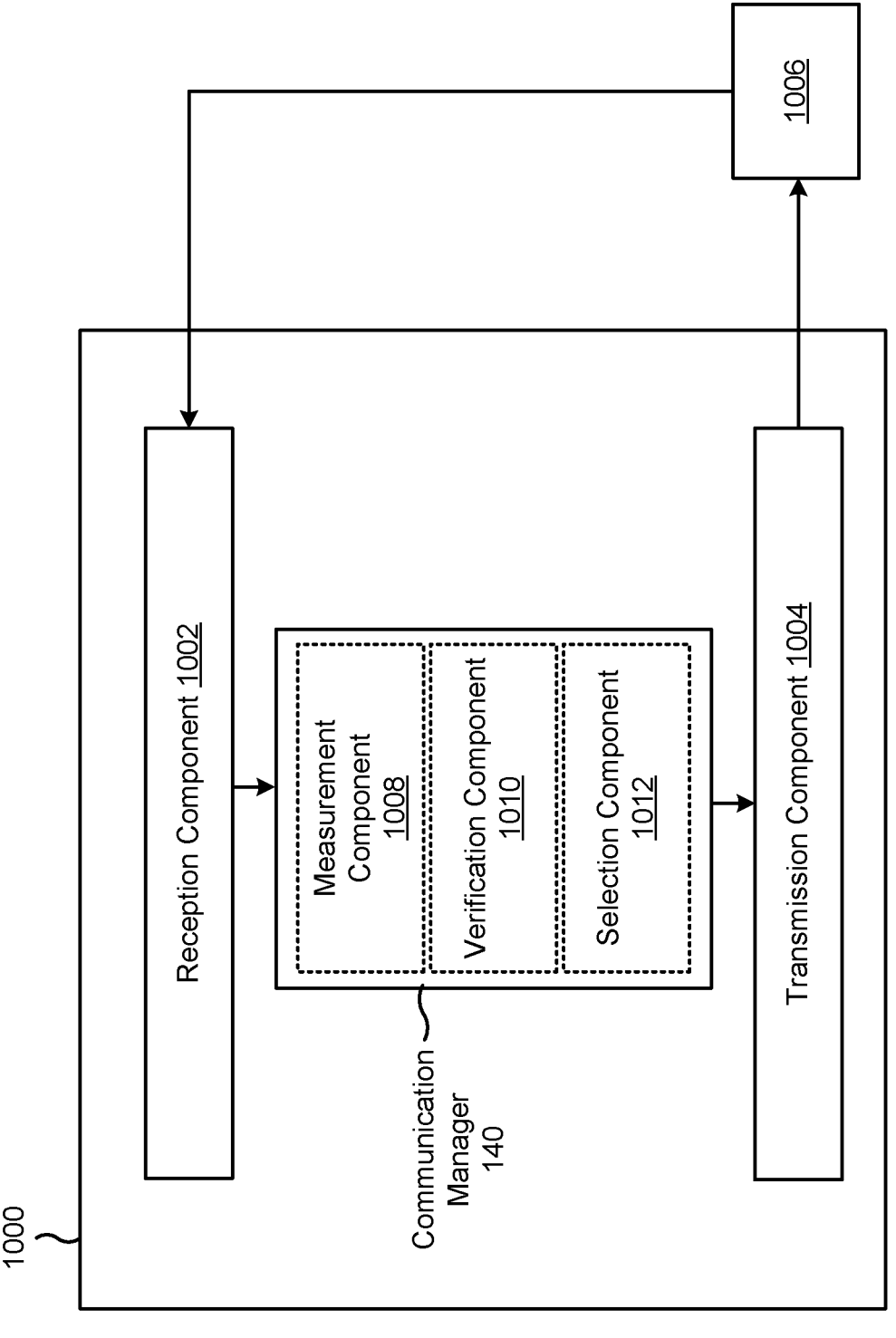
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a measurement component 1008, a verification component 1010, or a selection component 1012, among other examples.

In some aspects, the apparatus 1000 may be configured to perform one or more operations described herein in connection with FIGS. 6A-6B and 7A-7B. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The measurement component 1008 may perform EMR measurements for a first set of carriers in an EMR time window. The verification component 1010 may perform at least one verification operation for the EMR measurements based at least in part on at least one carrier measurement in a verification time window. The transmission component 1004 may transmit, to a network node, measurement results associated with the EMR measurements for one or more carriers in the first set of carriers based at least in part on the at least one verification operation.

The measurement component 1008 may perform cell reselection measurements for a second set of carriers, wherein the cell reselection measurements include at least one of RSRP or RSRQ measurements for the second set of carriers, wherein performing the at least one verification operation for the EMR measurements comprises performing a first verification operation based at least in part on a comparison between a first RSRP or RSRQ measurement for a reference carrier of the second set of carriers in the EMR time window and a second RSRP or RSRQ measurement for the reference carrier in the verification time window.

The reception component 1002 may receive, from the network node, an indication of the first set of carriers for which the EMR measurements are to be performed and an indication of at least one verification parameter associated with the at least one verification operation.

The reception component 1002 may receive configuration information indicating multiple target carriers for inter-frequency measurements. The measurement component 1008 may perform, in a first time window, a measurement for cell detection on a reference carrier of a group of carriers of the multiple target carriers. The selection component 1012 and/or the measurement component 1008 may selectively perform the inter-frequency measurements on the group of carriers in a second time window based at least in part on the cell detection on the reference carrier of the group of carriers.

The transmission component 1004 may transmit, to a network node, an indication of the inter-frequency measurements performed on the group of carriers.

The selection component 1012 and/or the transmission component 1004 may refrain from transmitting an indication of the inter-frequency measurements for the group of carriers to a network node.

The transmission component 1004 may transmit, to a network node, an indication that the inter-frequency measurements were not performed on the group of carriers in the second time window.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
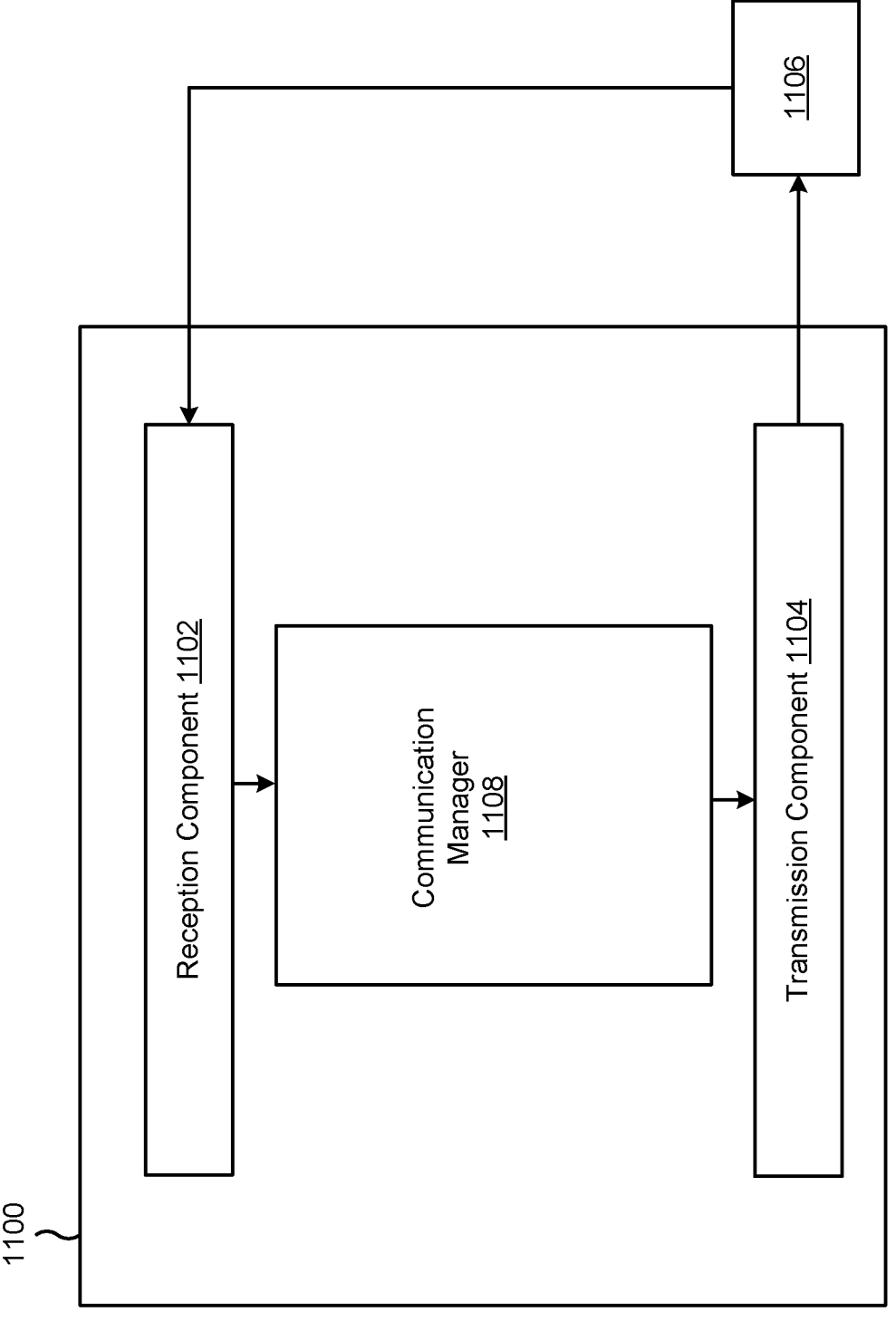

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIGS. 6A-6B and 7A-7B. Additionally, or alternatively, the apparatus 1100 may be configured to perform one or more processes described herein, or a combination thereof. In some aspects, the apparatus 1100 and/or one or more components shown in FIG. 11 may include one or more components of the network node described in connection with FIG. 2.

Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: performing early measurement report (EMR) measurements for a first set of carriers in an EMR time window; performing at least one verification operation for the EMR measurements based at least in part on at least one carrier measurement in a verification time window; and transmitting, to a network node, measurement results associated with the EMR measurements for one or more carriers in the first set of carriers based at least in part on the at least one verification operation.

Aspect 2: The method of Aspect 1, wherein performing the EMR measurements for the first set of carriers in the EMR time window comprises: performing the EMR measurements for the first set of carriers in the EMR time window while operating in an idle or inactive mode.

Aspect 3: The method of any of Aspects 1-2, further comprising performing cell reselection measurements for a second set of carriers, wherein the cell reselection measurements include at least one of reference signal received power (RSRP) or reference signal received quality (RSRQ) measurements for the second set of carriers, wherein performing the at least one verification operation for the EMR measurements comprises: performing a first verification operation based at least in part on a comparison between a first RSRP or RSRQ measurement for a reference carrier of the second set of carriers in the EMR time window and a second RSRP or RSRQ measurement for the reference carrier in the verification time window.

Aspect 4: The method of Aspect 3, wherein the reference carrier of the second set of carriers is an overlapping carrier included in the first set of carriers and the second set of carriers or an intra-frequency carrier included in the second set of carriers.

Aspect 5: The method of any of Aspects 3-4, wherein transmitting the measurement results associated with the EMR measurements for one or more carriers in the first set of carriers comprises: transmitting measurement result sets resulting in the EMR measurements in the EMR time window for the carriers in the first set of carriers based at least in part on a difference between the first RSRP or RSRQ measurement for the reference carrier and the second RSRP or RSRQ measurement for the reference carrier satisfying a threshold in the first verification operation.

Aspect 6: The method of any of Aspects 3-5, wherein performing the at least one verification operation for the EMR measurements further comprises: performing, in connection with a difference between the first RSRP or RSRQ measurement for the reference carrier and the second RSRP or RSRQ measurement for the reference carrier satisfying a first threshold in the first verification operation, a second verification operation based at least in part on RSRP or RSRQ measurements for at least a subset of carriers in the first set of carriers in the verification time window.

Aspect 7: The method of Aspect 6, wherein the second RSRP or RSRQ measurement for the reference carrier is performed in a first portion of the verification time window, and wherein the RSRP or RSRQ measurements for at least the subset of carriers in the first set of carriers are performed in a second portion of the verification time window.

Aspect 8: The method of any of Aspects 6-7, where performing the second verification operation comprises: performing, for each carrier in at least the subset of carriers in the first set of carriers, a per-carrier verification based at least in part on a comparison of a highest RSRP or RSRQ measurement for the carrier using a quantity of receive beams in the verification time window and an RSRP or RSRQ measurement for the carrier in the EMR window.

Aspect 9: The method of Aspect 8, wherein the performing the second verification operation comprises: performing the per-carrier verification for each carrier in the first set of carriers.

Aspect 10: The method of Aspect 8, wherein performing the second verification operation comprises: performing the per-carrier verification for each carrier in the subset of carriers, wherein the subset of carriers includes one or more carriers, in the first set of carriers, for which the RSRP or RSRQ measurement for the carrier satisfies a threshold.

Aspect 11: The method of any of Aspects 8-10, wherein for each cell in at least the subset of carriers in the first set of carriers, the quantity of the receive beams is based at least in part on a synchronization signal block (SSB) periodicity for the carrier, and the receive beams included in the quantity of receive beams are based at least in part on the EMR measurements in the EMR time window.

Aspect 12: The method of any of Aspects 8-11, wherein transmitting the measurement results associated with the EMR measurements for one or more carriers in the first set of carriers comprises: transmitting, for each of the one or more carriers, a respective measurement result associated with the EMR measurements based at least in part on a difference between the highest RSRP or RSRQ measurement for the carrier using the quantity of receive beams in the verification time window and the RSRP or RSRQ measurement for the carrier in the EMR window satisfying a second threshold.

Aspect 13: The method of any of Aspects 1-12, wherein the EMR measurements include at least one of reference signal received power (RSRP) or reference signal received quality (RSRQ) measurements for the first set of carriers, and wherein performing the at least one verification operation for the EMR measurements comprises: performing, for at least a subset of carriers in the first set of carriers, per-carrier verification based at least in part on RSRP or RSRQ measurements in the verification time window for at least the subset of carriers in the first set of carriers.

Aspect 14: The method of Aspect 13, wherein for each carrier in at least the subset of carriers in the first set of carriers, the per-carrier verification is based at least in part on a comparison of a highest RSRP or RSRQ measurement for the carrier using a quantity of receive beams in the verification time window and an RSRP or RSRQ measurement for the carrier in the EMR window.

Aspect 15: The method of Aspect 14, wherein performing the per-carrier verification comprises: performing the per-carrier verification for each carrier in the first set of carriers.

Aspect 16: The method of Aspect 14, wherein performing the per-carrier verification comprises: performing the per-carrier verification for each carrier in the subset of carriers, wherein the subset of carriers includes one or more carriers, in the first set of carriers, for which the RSRP or RSRQ measurement for the carrier satisfies a threshold.

Aspect 17: The method of any of Aspects 14-16, wherein transmitting the measurement results associated with the EMR measurements for one or more carriers in the first set of carriers comprises: transmitting, for each of the one or more carriers, a respective measurement result associated with the EMR measurements based at least in part on a difference between the highest RSRP or RSRQ measurement for the carrier using the quantity of receive beams in the verification time window and the RSRP or RSRQ measurement for the carrier in the EMR window satisfying a threshold.

Aspect 18: The method of any of Aspects 1-17, further comprising: receiving, from the network node, an indication of the first set of carriers for which the EMR measurements are to be performed and an indication of at least one verification parameter associated with the at least one verification operation.

Aspect 19: A method of wireless communication performed by a user equipment (UE), comprising: receiving configuration information indicating multiple target carriers for inter-frequency measurements; performing, in a first time window, a measurement for cell detection on a reference carrier of a group of carriers of the multiple target carriers; and selectively performing the inter-frequency measurements on the group of carriers in a second time window based at least in part on the cell detection on the reference carrier of the group of carriers.

Aspect 20: The method of Aspect 19, wherein selectively performing the inter-frequency measurements on the group of carriers comprises: performing the inter-frequency measurements on the group of carriers in the second time window in connection with a determination that a cell is detected on the reference carrier with a signal strength above a threshold in the first time window.

Aspect 21: The method of Aspect 20, wherein performing the inter-frequency measurements on the group of carriers in the second time window comprises: performing the inter-frequency measurements on the group of carriers using at least one of automatic gain control (AGC), time and frequency synchronization information, UE receive beam information, or network node transmit beam information determined based at least in part on the reference carrier of the group of carriers.

Aspect 22: The method of any of Aspects 20-21, further comprising: transmitting, to a network node, an indication of the inter-frequency measurements performed on the group of carriers.

Aspect 23: The method of Aspect 19, wherein selectively performing the inter-frequency measurements on the group of carriers comprises: refraining from performing the inter-frequency measurements on the group of carriers in the second time window in connection with a determination that a cell is not detected on the reference carrier with a signal strength above a threshold in the first time window.

Aspect 24: The method of Aspect 23, further comprising: refraining from transmitting an indication of the inter-frequency measurements for the group of carriers to a network node.

Aspect 25: The method of any of Aspects 23-24, further comprising: transmitting, to a network node, an indication that the inter-frequency measurements were not performed on the group of carriers in the second time window.

Aspect 26: The method of any of Aspects 19-25, wherein the configuration information indicates the carriers, of the multiple target carriers, included in the group of carriers.

Aspect 27: The method of any of Aspects 19-26, wherein the configuration information indicates the reference carrier of the group of carriers.

Aspect 28: The method of any of Aspects 19-27, wherein the group of carriers includes a group of intra-band or intra-band contiguous carriers of the multiple target carriers.

Aspect 29: The method of any of Aspects 19-28, wherein the first time window and the second time window are in a first measurement occasion for the group of carriers, and further comprising: performing a measurement on the reference carrier of the group of carriers in a second measurement occasion; and refraining from performing inter-frequency measurements for carriers, other than the reference carrier, in the group of carriers in the second measurement occasion based at least in part on a comparison of the measurement on the reference carrier in the second measurement occasion and the measurement on the reference carrier in the first measurement occasion.

Aspect 30: An apparatus for wireless communication at a device, comprising a processor; memory coupled with the processor; and instructions stored in the memory and executable by the processor to cause the apparatus to perform the method of one or more of Aspects 1-18.

Aspect 31: A device for wireless communication, comprising a memory and one or more processors coupled to the memory, the one or more processors configured to perform the method of one or more of Aspects 1-18.

Aspect 32: An apparatus for wireless communication, comprising at least one means for performing the method of one or more of Aspects 1-18.

Aspect 33: A non-transitory computer-readable medium storing code for wireless communication, the code comprising instructions executable by a processor to perform the method of one or more of Aspects 1-18.

Aspect 34: A non-transitory computer-readable medium storing a set of instructions for wireless communication, the set of instructions comprising one or more instructions that, when executed by one or more processors of a device, cause the device to perform the method of one or more of Aspects 1-18.

Aspect 35: An apparatus for wireless communication at a device, comprising a processor; memory coupled with the processor; and instructions stored in the memory and executable by the processor to cause the apparatus to perform the method of one or more of Aspects 19-29.

Aspect 36: A device for wireless communication, comprising a memory and one or more processors coupled to the memory, the one or more processors configured to perform the method of one or more of Aspects 19-29.

Aspect 37: An apparatus for wireless communication, comprising at least one means for performing the method of one or more of Aspects 19-29.

Aspect 38: A non-transitory computer-readable medium storing code for wireless communication, the code comprising instructions executable by a processor to perform the method of one or more of Aspects 19-29.

Aspect 39: A non-transitory computer-readable medium storing a set of instructions for wireless communication, the set of instructions comprising one or more instructions that, when executed by one or more processors of a device, cause the device to perform the method of one or more of Aspects 19-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving configuration information indicating multiple target carriers for inter-frequency measurements;
   performing, in a first time window, a measurement for cell detection on a reference carrier of a group of carriers of the multiple target carriers; and
   selectively performing the inter-frequency measurements on the group of carriers in a second time window based at least in part on the cell detection on the reference carrier of the group of carriers.

2. The method of claim 1, wherein selectively performing the inter-frequency measurements on the group of carriers comprises:
   performing the inter-frequency measurements on the group of carriers in the second time window in connection with a determination that a cell is detected on the reference carrier with a signal strength above a threshold in the first time window.

3. The method of claim 2, wherein performing the inter-frequency measurements on the group of carriers in the second time window comprises:
   performing the inter-frequency measurements on the group of carriers using at least one of automatic gain control (AGC), time and frequency synchronization information, UE receive beam information, or network node transmit beam information determined based at least in part on the reference carrier of the group of carriers.

4. The method of claim 2, further comprising:
   transmitting, to a network node, an indication of the inter-frequency measurements performed on the group of carriers.

5. The method of claim 1, wherein selectively performing the inter-frequency measurements on the group of carriers comprises:
   refraining from performing the inter-frequency measurements on the group of carriers in the second time window in connection with a determination that a cell is not detected on the reference carrier with a signal strength above a threshold in the first time window.

6. The method of claim 5, further comprising:
   refraining from transmitting an indication of the inter-frequency measurements for the group of carriers to a network node.

7. The method of claim 5, further comprising:
   transmitting, to a network node, an indication that the inter-frequency measurements were not performed on the group of carriers in the second time window.

8. A user equipment (UE) for wireless communication, comprising:
   one or more memories; and
   one or more processors, coupled to the one or more memories, configured to:
      receive configuration information indicating multiple target carriers for inter-frequency measurements;
      perform, in a first time window, a measurement for cell detection on a reference carrier of a group of carriers of the multiple target carriers; and
      selectively perform the inter-frequency measurements on the group of carriers in a second time window based at least in part on the cell detection on the reference carrier of the group of carriers.

9. The UE of claim 8, wherein the one or more processors, to selectively perform the inter-frequency measurements on the group of carriers, are configured to:
   perform the inter-frequency measurements on the group of carriers in the second time window in connection with a determination that a cell is detected on the reference carrier with a signal strength above a threshold in the first time window; or
   refrain from performing the inter-frequency measurements on the group of carriers in the second time window in connection with a determination that a cell is not detected on the reference carrier with a signal strength above a threshold in the first time window.

10. The UE of claim 9, wherein the one or more processors, to perform the inter-frequency measurements on the group of carriers in the second time window, are configured to:
   perform the inter-frequency measurements on the group of carriers using at least one of automatic gain control (AGC), time and frequency synchronization information, UE receive beam information, or network node transmit beam information determined based at least in part on the reference carrier of the group of carriers.

11. The UE of claim 9, wherein the one or more processors are further configured to:
   transmit, to a network node, an indication of the inter-frequency measurements performed on the group of carriers.

12. The UE of claim 8, wherein the one or more processors, to selectively perform the inter-frequency measurements on the group of carriers, are configured to:

refrain from performing the inter-frequency measurements on the group of carriers in the second time window in connection with a determination that a cell is not detected on the reference carrier with a signal strength above a threshold in the first time window.

13. The UE of claim 12, wherein the one or more processors are further configured to:

refrain from transmitting an indication of the inter-frequency measurements for the group of carriers to a network node.

14. The UE of claim 12, wherein the one or more processors are further configured to:

transmit, to a network node, an indication that the inter-frequency measurements were not performed on the group of carriers in the second time window.

15. An apparatus for wireless communication, comprising:

means for receiving configuration information indicating multiple target carriers for inter-frequency measurements;

means for performing, in a first time window, a measurement for cell detection on a reference carrier of a group of carriers of the multiple target carriers; and means for selectively performing the inter-frequency measurements on the group of carriers in a second time window based at least in part on the cell detection on the reference carrier of the group of carriers.

16. The apparatus of claim 15, wherein the means for selectively performing the inter-frequency measurements on the group of carriers comprises:

means for performing the inter-frequency measurements on the group of carriers in the second time window in connection with a determination that a cell is detected on the reference carrier with a signal strength above a threshold in the first time window.

17. The apparatus of claim 16, wherein the means for performing the inter-frequency measurements on the group of carriers in the second time window comprises:

means for performing the inter-frequency measurements on the group of carriers using at least one of automatic gain control (AGC), time and frequency synchronization information, user equipment (UE) receive beam information, or network node transmit beam information determined based at least in part on the reference carrier of the group of carriers.

18. The apparatus of claim 16, further comprising:

means for transmitting, to a network node, an indication of the inter-frequency measurements performed on the group of carriers.

19. The apparatus of claim 15, wherein the means for selectively performing the inter-frequency measurements on the group of carriers comprises:

means for refraining from performing the inter-frequency measurements on the group of carriers in the second time window in connection with a determination that a cell is not detected on the reference carrier with a signal strength above a threshold in the first time window.

20. The apparatus of claim 19, further comprising:

means for refraining from transmitting an indication of the inter-frequency measurements for the group of carriers to a network node.

21. The apparatus of claim 19, further comprising:

means for transmitting, to a network node, an indication that the inter-frequency measurements were not performed on the group of carriers in the second time window.

22. A non-transitory computer-readable medium storing a set of instructions for wireless communication that, when executed by one or more processors of a user equipment (UE), cause the UE to:

receive configuration information indicating multiple target carriers for inter-frequency measurements;

perform, in a first time window, a measurement for cell detection on a reference carrier of a group of carriers of the multiple target carriers; and selectively perform the inter-frequency measurements on the group of carriers in a second time window based at least in part on the cell detection on the reference carrier of the group of carriers.

23. The non-transitory computer-readable medium of claim 22, wherein the set of instructions further cause the UE to:

perform the inter-frequency measurements on the group of carriers in the second time window in connection with a determination that a cell is detected on the reference carrier with a signal strength above a threshold in the first time window; or refrain from performing the inter-frequency measurements on the group of carriers in the second time window in connection with a determination that a cell is not detected on the reference carrier with a signal strength above a threshold in the first time window.

24. The non-transitory computer-readable medium of claim 23, wherein the set of instructions that cause the UE to perform the inter-frequency measurements on the group of carriers in the second time window further cause the UE to:

perform the inter-frequency measurements on the group of carriers using at least one of automatic gain control (AGC), time and frequency synchronization information, UE receive beam information, or network node transmit beam information determined based at least in part on the reference carrier of the group of carriers.

25. The non-transitory computer-readable medium of claim 23, wherein the set of instructions further cause the UE to:

transmit, to a network node, an indication of the inter-frequency measurements performed on the group of carriers.

26. The non-transitory computer-readable medium of claim 22, wherein the set of instructions that cause the UE to selectively perform the inter-frequency measurements on the group of carriers further cause the UE to:

refrain from performing the inter-frequency measurements on the group of carriers in the second time window in connection with a determination that a cell is not detected on the reference carrier with a signal strength above a threshold in the first time window.

27. The non-transitory computer-readable medium of claim 26, wherein the set of instructions further cause the UE to:

refrain from transmitting an indication of the inter-frequency measurements for the group of carriers to a network node.

28. The non-transitory computer-readable medium of claim 26, wherein the set of instructions further cause the UE to:

transmit, to a network node, an indication that the inter-frequency measurements were not performed on the group of carriers in the second time window.

\* \* \* \* \*